United States Patent
Kato et al.

(10) Patent No.: US 8,655,057 B2
(45) Date of Patent: Feb. 18, 2014

(54) INFORMATION PROCESSING APPARATUS AND INFORMATION PROCESSING METHOD

(75) Inventors: Masami Kato, Sagamihara (JP); Takahisa Yamamoto, Kawasaki (JP); Yoshinori Ito, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 450 days.

(21) Appl. No.: 12/682,028

(22) PCT Filed: Oct. 29, 2008

(86) PCT No.: PCT/JP2008/070158
§ 371 (c)(1),
(2), (4) Date: Apr. 7, 2010

(87) PCT Pub. No.: WO2009/057815
PCT Pub. Date: May 7, 2009

(65) Prior Publication Data
US 2010/0209010 A1  Aug. 19, 2010

(30) Foreign Application Priority Data
Nov. 1, 2007  (JP) .................. 2007-285401

(51) Int. Cl.
*G06K 9/46* (2006.01)
*G06K 9/62* (2006.01)
*G06E 1/00* (2006.01)

(52) U.S. Cl.
USPC ........ 382/159; 382/190; 382/224; 704/256.8; 706/20

(58) Field of Classification Search
USPC ......... 382/159, 118, 132, 165, 224, 103, 190, 382/226; 704/243, 256.8, 256, 256.5, 704/E15.004, E15.039, 233, 251; 706/48, 706/14, 20
See application file for complete search history.

(56) References Cited

U.S. PATENT DOCUMENTS

| | | | |
|---|---|---|---|
| 5,508,823 A * | 4/1996 | Kiyohara et al. ............. | 358/463 |
| 7,699,423 B2 | 4/2010 | Suwa et al. | |
| 7,835,541 B2 * | 11/2010 | Lee et al. ...................... | 382/103 |
| 7,876,965 B2 * | 1/2011 | Ai et al. ........................ | 382/226 |
| 7,881,524 B2 * | 2/2011 | Matsugu et al. .............. | 382/156 |

(Continued)

FOREIGN PATENT DOCUMENTS

| | | |
|---|---|---|
| CN | 1952954 A | 4/2007 |
| JP | 2003-163827 | 6/2003 |

(Continued)

OTHER PUBLICATIONS

Chinese Office Action dated Sep. 22, 2011 issued in Chinese Patent Application No. 200880113671.1.

(Continued)

*Primary Examiner* — Sheela Chawan
(74) *Attorney, Agent, or Firm* — Fitzpatrick, Cella, Harper & Scinto

(57) ABSTRACT

In an information processing apparatus that processes data using cascade-connected weak classifiers, processing specification information specifying the processing content of each of the weak classifiers is stored. The weak classifiers to be used in processing the data are selected from the weak classifiers by referring to a table in which is specified information for determining the weak classifiers to be used based on a condition for processing the data. The data is then processed by the selected weak classifiers based on the processing specification information that corresponds to those weak classifiers, and an object is extracted from the data using an obtained evaluation value. Through this, a combination of extraction process speed and extraction accuracy can be changed in a flexible manner when extracting a specific object from image data.

15 Claims, 22 Drawing Sheets

(56) References Cited

U.S. PATENT DOCUMENTS

| | | | |
|---|---|---|---|
| 8,155,396 B2* | 4/2012 | Ito | 382/118 |
| 2006/0228005 A1 | 10/2006 | Matsugu et al. | |
| 2009/0157707 A1 | 6/2009 | Ito et al. | |

FOREIGN PATENT DOCUMENTS

| | | |
|---|---|---|
| JP | 2005-100121 | 4/2005 |
| JP | 2007-109229 | 4/2007 |

OTHER PUBLICATIONS

Freund, et al., "A decision-theoretic generalization of on-line learning and an application to boosting" (in Eurocolt '95), Computational Learning and Theory, pp. 23-37 (1995).

Viola, et al., "Rapid Object Detection using a Boosted Cascade of Simple Features", Accepted Conference on Computer Vision and Pattern Recognition, pp. 1-9 (2001).

U.S. Appl. No. 12/602,091, filed Nov. 25, 2009. Applicants: Ito et al.

* cited by examiner

F I G. 3
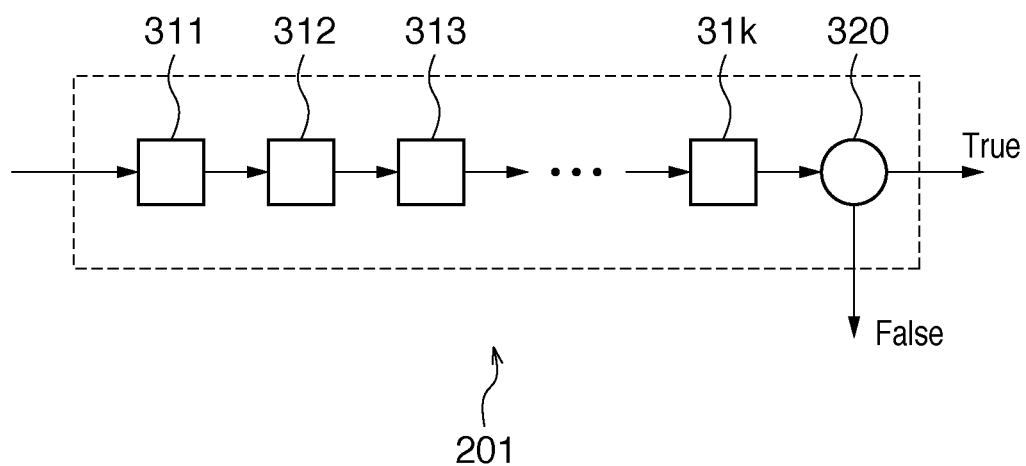

F I G. 7

| | PROCESSED STAGE NUMBER | STAGE 1 | | STAGE 2 | | ... | STAGE n | |
|---|---|---|---|---|---|---|---|---|
| OPERATIONAL CLOCK 1 | N1 | S11 | Th11 | S12 | Th12 | ... | S1n | Th1n |
| OPERATIONAL CLOCK 2 | N2 | S21 | Th21 | S22 | Th22 | ... | S2n | Th2n |
| OPERATIONAL CLOCK 3 | N3 | S31 | Th31 | S32 | Th32 | ... | S3n | Th3n |

FIG. 11

| | PROCESSED STAGE NUMBER | STAGE 1 | | STAGE 2 | | ... | ... | STAGE n | |
|---|---|---|---|---|---|---|---|---|---|
| OPERATIONAL CLOCK 1 | N1 | M11 | Th11 | M12 | Th12 | ... | ... | M1n | Th1n |
| OPERATIONAL CLOCK 2 | N2 | M21 | Th21 | M22 | Th22 | ... | ... | M2n | Th2n |
| OPERATIONAL CLOCK 3 | N3 | M31 | Th31 | M32 | Th32 | ... | ... | M3n | Th3n |

FIG. 13

| EXTRACTION RESULT OF PREVIOUS FRAME | PROCESSED STAGE NUMBER | STAGE 1 | | STAGE 2 | | ... | STAGE n | |
|---|---|---|---|---|---|---|---|---|
| EXTRACTED NUMBER ≤ D1 | N1 | M11 | Th11 | M12 | Th12 | ... | M1n | Th1n |
| D1 < EXTRACTED NUMBER < D2 | N2 | M21 | Th21 | M22 | Th22 | ... | M2n | Th2n |
| EXTRACTED NUMBER > D2 | N3 | M31 | Th31 | M32 | Th32 | ... | M3n | Th3n |

FIG. 16

| OPERATIONAL MODE | PROCESSED STAGE NUMBER | STAGE 1 | | STAGE 2 | | ... | ... | STAGE n | |
|---|---|---|---|---|---|---|---|---|---|
| PORTRAIT MODE | N1 | M11 | Th11 | M12 | Th12 | ... | ... | M1n | Th1n |
| STANDARD MODE | N2 | M21 | Th21 | M22 | Th22 | ... | ... | M2n | Th2n |

FIG. 17

| OPERATIONAL MODE | PROCESSED STAGE NUMBER | STAGE 1 | | STAGE 2 | | ... | ... | STAGE n | |
|---|---|---|---|---|---|---|---|---|---|
| OFFLINE MODE | N1 | M11 | Th11 | M12 | Th12 | ... | ... | M1n | Th1n |
| ONLINE MODE | N2 | M21 | Th21 | M22 | Th22 | ... | ... | M2n | Th2n |

F I G. 22

| PROCESSED STAGE NUMBER | STAGE 1 | | | STAGE 2 | | | ... | STAGE n | | |
|---|---|---|---|---|---|---|---|---|---|---|
| OPERATIONAL CLOCK 1 | N1 | P11 | AD11 | Th11 | P12 | AD12 | Th12 | ... | P1n | AD1n | Th1n |
| OPERATIONAL CLOCK 2 | N2 | P21 | AD21 | Th21 | P22 | AD22 | Th22 | ... | P2n | AD2n | Th2n |
| OPERATIONAL CLOCK 3 | N3 | P31 | AD31 | Th31 | P32 | AD32 | Th32 | ... | P3n | AD3n | Th3n |

F I G. 23

| DETECTION MODE | PROCESSED STAGE NUMBER | STAGE 1 | | STAGE 2 | | ... | STAGE n | |
|---|---|---|---|---|---|---|---|---|
| HIGH-ACCURACY MODE | N1 | M11 | Th11 | M12 | Th12 | ... | M1n | Th1n |
| HIGH-SPEED MODE | N2 | M21 | Th21 | M22 | Th22 | ... | M2n | Th2n |

INFORMATION PROCESSING APPARATUS AND INFORMATION PROCESSING METHOD

TECHNICAL FIELD

The present invention relates to an information processing technique for processing data using multiple weak classifiers that are cascade-connected.

BACKGROUND ART

In recent years, various methods for extracting specific objects, such as human faces, from image data have been proposed, and are being put to actual use.

Among such methods, the method disclosed in Viola, P. & Jones, M.'s "Rapid Object Detection using a Boosted Cascade of Simple Features" (Proc. of Computer Vision and Pattern Recognition, December 2001, IEEE Computer Society, pp. 511-518) is garnering attention due to its high speed (this document shall be referred to as Document 1 hereinafter). This method cascade-connects classifiers made up of multiple weak classifier groups generated using a learning algorithm with boosting, and carries out processing while performing terminating judgment for each classifier. Note that the details of learning algorithms with boosting are disclosed in, for example, Yoav Freund and Robert E. Schapire's "A decision-theoretic generalization of on-line learning and an application to boosting" (in Eurocolt '95, Computational Learning and Theory; Springer-Verlag, 1995, pp. 23-37).

FIG. 24 illustrates the overall structure used for this technique. 2401 to 240n (where n is a natural number) are classifiers (also called "stages") generated through learning, and each classifier is configured of, for example, multiple rectangular filters whose processing load is low. Each of the rectangular filters used at this time are generally called "weak classifiers" due to the fact their classification capabilities are not very high.

FIG. 25 is a diagram illustrating a rectangular filter for extracting a specific object. 2501a to 2501c are examples of image blocks from which extraction is to be performed using the rectangular filters, and are partial images of a predetermined size cut out from the overall image data.

FIG. 26, meanwhile, is a diagram expressing image data to be processed. In this diagram, 2601 indicates a single frame's worth of the image data to be processed. Meanwhile, 2602 indicates a processing block, which is the unit of processing used when the single frame's worth of the image data to be processed is actually processed; the processing block is a partial image whose size corresponds to the size of rectangular filters 2502a to 2502c. Characteristics of a local region within the partial image are extracted by using the rectangular filters 2502a to 2502c to calculate the differences between the sum of region data indicated by the white regions and black regions.

A specific object within the image data 2601 is extracted by sequentially scanning the entirety of the image data 2601 using a predetermined step size based on the partial image 2602 and processing the image data using the unit of processing.

Each of the classifiers 2401 to 240n accumulate evaluation values that are the output of the determination results for each rectangular filter, and determine whether or not the specific object is present by performing a thresholding process using an identification threshold. As described above, the classifiers 2401 to 240n are cascade-connected, and each classifier advances the processing to the following classifier only when it has been determined that the specific object is present in the partial image 2602 of the unit of processing.

In this manner, the stated method determines whether the partial image of the unit of processing is the specific object or is not the specific object at each classifier, also called a stage; in the case where it is determined that the partial image is not the specific object, the computations are ended immediately. With actual image data, the partial image is often determined to not be the specific object in the initial stages, and therefore a high-speed extraction process can be implemented.

Here, consider a case where a function for extracting a specific object using a method such as that described in Document 1 is implemented in an embedded device or the like. Such a case requires the tradeoff between the extraction accuracy and the extraction process speed to be adjusted based on the purpose of the extraction and the computational performance of the embedded device.

A case where a unit implemented through hardware (or an integrated circuit) is installed, as a common device, in multiple embedded devices whose specifications differ from one another can be given as one example. In such a case, it is desirable to adjust the tradeoff between the extraction accuracy and the extraction process speed based on the operational clocks, use conditions, and so on of the embedded devices in which the unit is installed.

Furthermore, even when the unit is installed in identical embedded devices, there are cases where the required extraction accuracy and extraction process time differ depending on the type of applications installed in the embedded devices. The performance of the embedded devices can also be optimized in such cases if the tradeoff between the extraction accuracy and the extraction process speed can be adjusted.

Such situations have conventionally been addressed by reducing the resolution of the image data to be processed, broadening the step size used when scanning the image data to be processed based on the partial image, and so on. For example, Document discloses a method for changing the step size.

However, when addressing situations such as these, there is a problem that the tradeoff between the extraction accuracy and the extraction process speed cannot be flexibly realized. For example, when attempting to control the extraction process speed by changing the resolution, it is necessary to convert the resolution of the inputted image data to the corresponding resolution. It is further necessary to prepare multiple classifiers that correspond to each resolution.

Moreover, even when the step size is changed, there is a limit on the types (for example, setting the step size to a unit of n pixels) of tradeoff points (that is, an appropriate combination of extraction accuracy and extraction process speed), resulting in the problem that control cannot be implemented in a flexible manner.

Such a situation can conceivably be addressed as disclosed in Japanese Patent Laid-Open No. 2005-100121, which takes into consideration the amount of computations performed by the embedded device to which the unit is to be applied. Here, learning is performed in advance using multiple classifiers, and a group of classifiers suited to the embedded device is selected from multiple groups of classifiers when performing the extraction process. However, in this case, it is necessary to prepare multiple differing classifier groups for each tradeoff point in advance, resulting in the problem that an increased amount of resources, such as memory and so on, will be required. This is particularly problematic in cases where the amount of parameter information is high, such as when a large number of classifiers are to be configured.

DISCLOSURE OF INVENTION

Having been conceived in light of the abovementioned problems, it is an object of the present invention to make it possible to flexibly change the combination of extraction process speed and extraction accuracy when extracting a specific object from inputted data using multiple cascade-connected weak classifiers.

In order to achieve the above object, an information processing apparatus according to the present invention is configured comprising: a plurality of weak classifiers that are cascade-connected and that process data; a first storage unit that stores information specifying the processing content of each of the weak classifiers; a second storage unit that stores a table in which is specified a prerequisite condition for processing the data and information for determining which of the weak classifiers are to be used in processing the data, for each prerequisite condition; a selection unit that selects the weak classifiers to be used in processing the data from among the weak classifiers by referring to the table; and an extraction unit that extracts an object from the data using an evaluation value obtained by the weak classifiers processing the data based on the information defining the processing details corresponding to the weak classifiers selected by the selection unit.

According to the present invention, it is possible to flexibly change the combination of extraction process speed and extraction accuracy when extracting a specific object from inputted data using multiple cascade-connected weak classifiers.

Further features of the present invention will become apparent from the following description of an exemplary embodiment (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a diagram illustrating, in detail, the configuration of a rectangular filter computation unit.

FIG. 7 is a diagram illustrating an example of a table that associates operational clocks with the total number of weak classifiers used.

FIG. 11 is a diagram illustrating an example of a table that associates operational clocks with the total number of weak classifiers used.

FIG. 13 is a diagram illustrating an example of a table that associates the extracted number of extraction target objects in the previous frame with the total number of weak classifiers used.

FIG. 16 is a diagram illustrating an example of a table that associates image capturing modes with the total number of weak classifiers used.

FIG. 17 is a diagram illustrating an example of a table that associates operational modes with the total number of weak classifiers used.

FIG. 22 is a diagram illustrating an example of a table that associates operational clocks with the total number of weak classifiers used.

FIG. 23 is a diagram illustrating an example of a table for determining extraction conditions in the case where there are two extraction modes.

BEST MODE FOR CARRYING OUT THE INVENTION

Hereinafter, various embodiments of the present invention shall be described in detail with reference to the drawings.

(First Embodiment)

<Hardware Configuration of Pattern Identification Apparatus>

Figure 1:
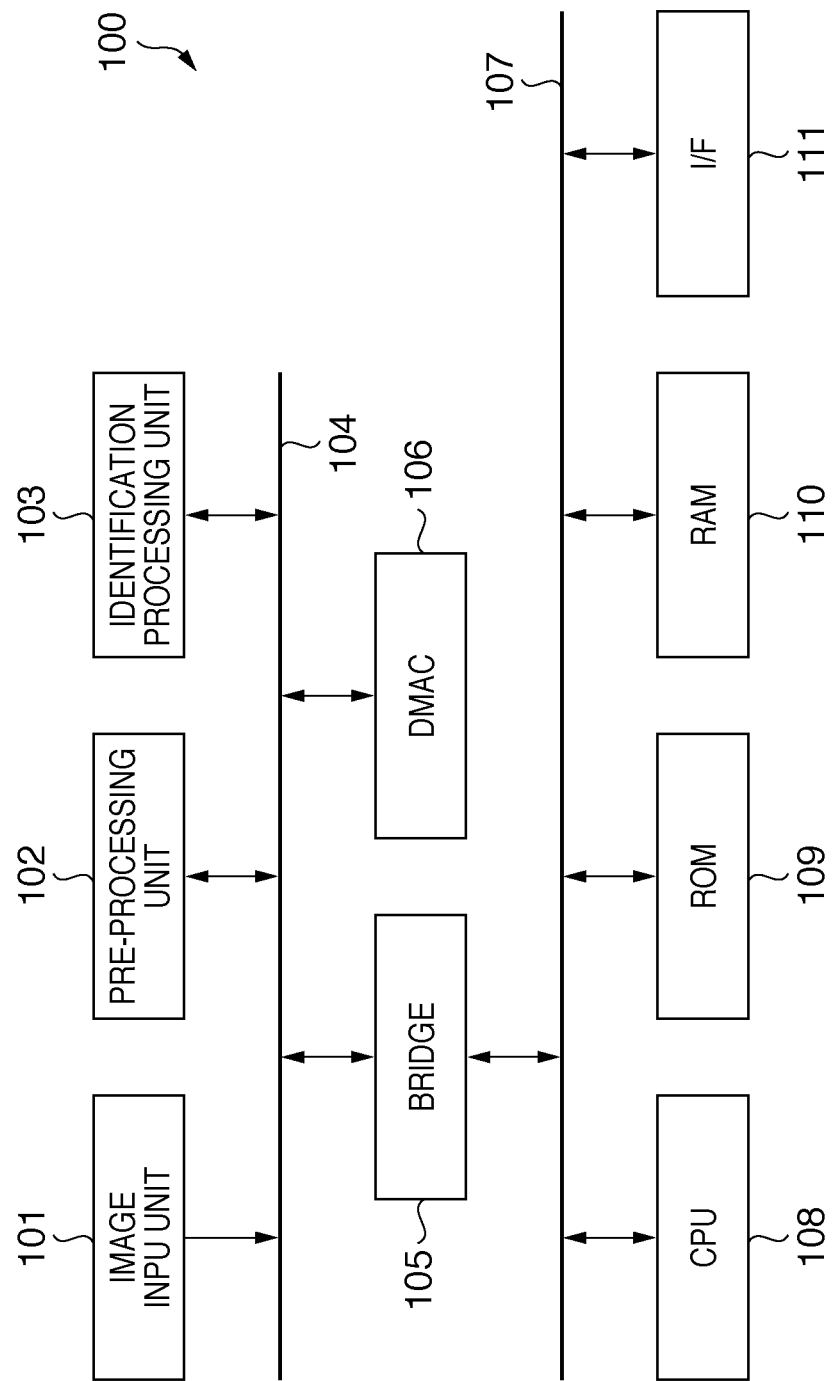
FIG. 1 is a diagram illustrating an example of the configuration of an information processing apparatus according to a first embodiment of the present invention.

FIG. 1 is a diagram illustrating an example of the hardware configuration of an information processing apparatus (a pattern identification apparatus 100) according to a first embodiment of the present invention. The pattern identification apparatus 100 has functionality for extracting a specific object (an image pattern) from image data.

In FIG. 1, 101 is an image input unit, and is configured of an optical system, a photoelectric conversion device, a driver circuit that controls the photoelectric conversion device, an AD converter, a signal processing circuit that performs various types of image correction, a frame buffer, and so on. The photoelectric conversion device described here includes a CCD (Charge-Coupled Device), a CMOS (Complimentary Metal Oxide Semiconductor) sensor, or the like.

102 is a pre-processing unit that performs various types of pre-processes that enable the extraction process to be carried out effectively. To be more specific, the pre-processing unit 102 uses hardware to perform image data conversions such as color conversion processes, contrast correction processes, and so on based on a color-conversion table, contrast correction information, and so on.

103 is an identification processing unit, and is a hardware block that executes processes essential to implementing an information processing method according to the present embodiment. Details regarding the identification processing unit 103 shall be given later with reference to FIG. 2.

106 is a DMAC (Direct Memory Access Controller). The DMAC 106 performs functions such as data transfer between various processing devices connected to an image bus 104, and between the devices connected to the image bus 104 and a RAM 110 and ROM 109 connected to a CPU (Central Processing Unit) bus 107.

105 is a bridge that provides a bridging function for the image bus 104 and the CPU bus 107. 108 is a CPU that controls the overall operations of the pattern identification apparatus 100. 109 is a ROM (Read Only Memory) that stores commands that regulate the operations of the CPU 108 and data necessary for various computations.

110 is a memory (RAM, or Random Access Memory) necessary for the operations of the CPU 108. The RAM 110 is configured of a comparatively high-capacity memory, such as a DRAM (Dynamic RAM) or the like.

The CPU 108 is capable of accessing the various processing units connected to the image bus 104 via the bridge 105. By separating the image bus 104 and the CPU bus 107, it is possible to operate the various processing units (101 to 103) implemented through hardware and the CPU 108 simultaneously.

111 is an interface unit, and is an input/output interface by which an operator specifies the operations of the pattern identification apparatus 100.

<Detailed Configuration of Identification Processing Unit 103>

Figure 2:
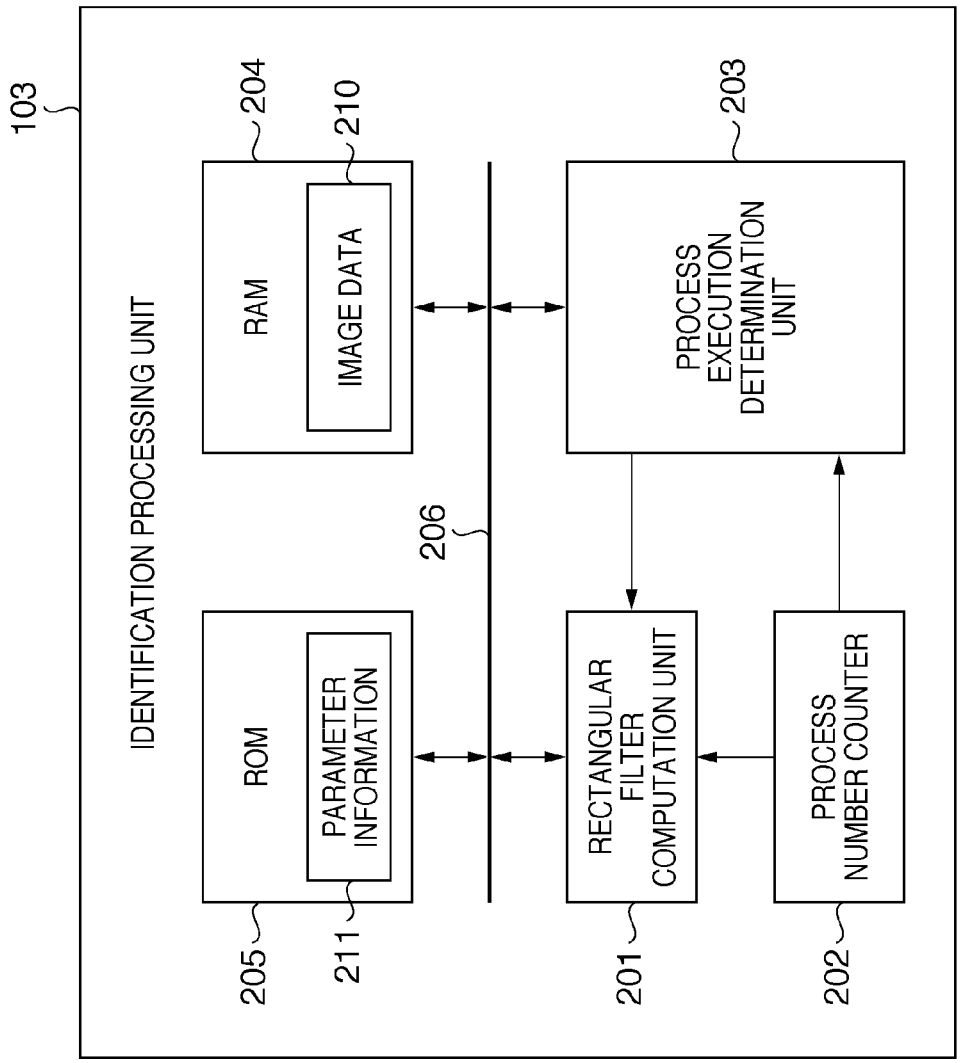
FIG. 2 is a diagram illustrating the details of an identification processing unit.

FIG. 2 is a diagram illustrating the details of the identification processing unit 103. 201 is a rectangular filter computation unit that executes a predetermined rectangular filter computation process on image data 210 that is to be processed and that is stored in a RAM 204. The RAM 204 is a memory that stores the image data 210 that is to be processed, and is configured of a high-speed, low-latency memory. 205 is a ROM, and stores parameter information 211 that specifies the computational details of each rectangular filter.

The rectangular filter computation unit 201 accesses the image data 210 in the RAM 204 in accordance with rectangular coordinate information (described later) in the parameter information 211 stored in the ROM 205, and sequentially executes computational processing and weak classification processing using the rectangular filters generated through learning performed in advance.

202 is a process number counter, and is configured of a counter or the like that counts the number of the rectangular filter that is currently being used for processing and the number of the stage in which the processing is currently being performed. 203 is a processing execution determination unit, and controls the rectangular filter computation unit 201 in accordance with a rectangular filter process number counter and a stage process number counter provided in the process number counter 202 as well as the presence/absence and ending conditions of the execution of a rectangular filter specified externally.

In other words, the rectangular filter specified by the processing execution determination unit 203 from the multiple rectangular filters obtained in advance through learning is used in the actual processing performed by the rectangular filter computation unit 201.

206 is an internal local bus for the identification processing unit 103, and is assumed to be connected to the image bus 104 via a bridge (not shown). The CPU 108 accesses the various devices (201 to 205) connected to the internal local bus 206 via the bridge.

<Detailed Configuration of Rectangular Filter Computation Unit 201>

Figure 24:
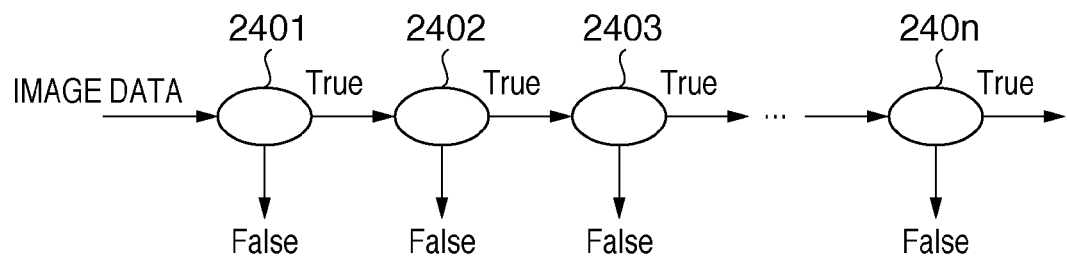
FIG. 24 is a diagram illustrating a method that cascade-connects multiple classifiers and carries out processing while performing terminating judgment for each classifier.

FIG. 3 is a diagram illustrating, in detail, the configuration of the rectangular filter computation unit 201. FIG. 3 corresponds to the diagram in FIG. 24 that illustrates the details of 2401 to 240$n$. 311 to 31$k$ are each classifiers, and the multiple rectangular filters execute the computational processes and weak classification processing in accordance with the parameter information 211 stored in the ROM 205. 320 is a classification processing unit that performs a thresholding process, using an identification threshold, on the cumulative values of evaluation values, the evaluation values being the results of the weak classification processing performed by the respective rectangular filters 311 to 31$k$; the classification processing unit 320 then determines whether or not the extraction target object is present.

<Configuration of Parameter Information 211>

Figure 4:
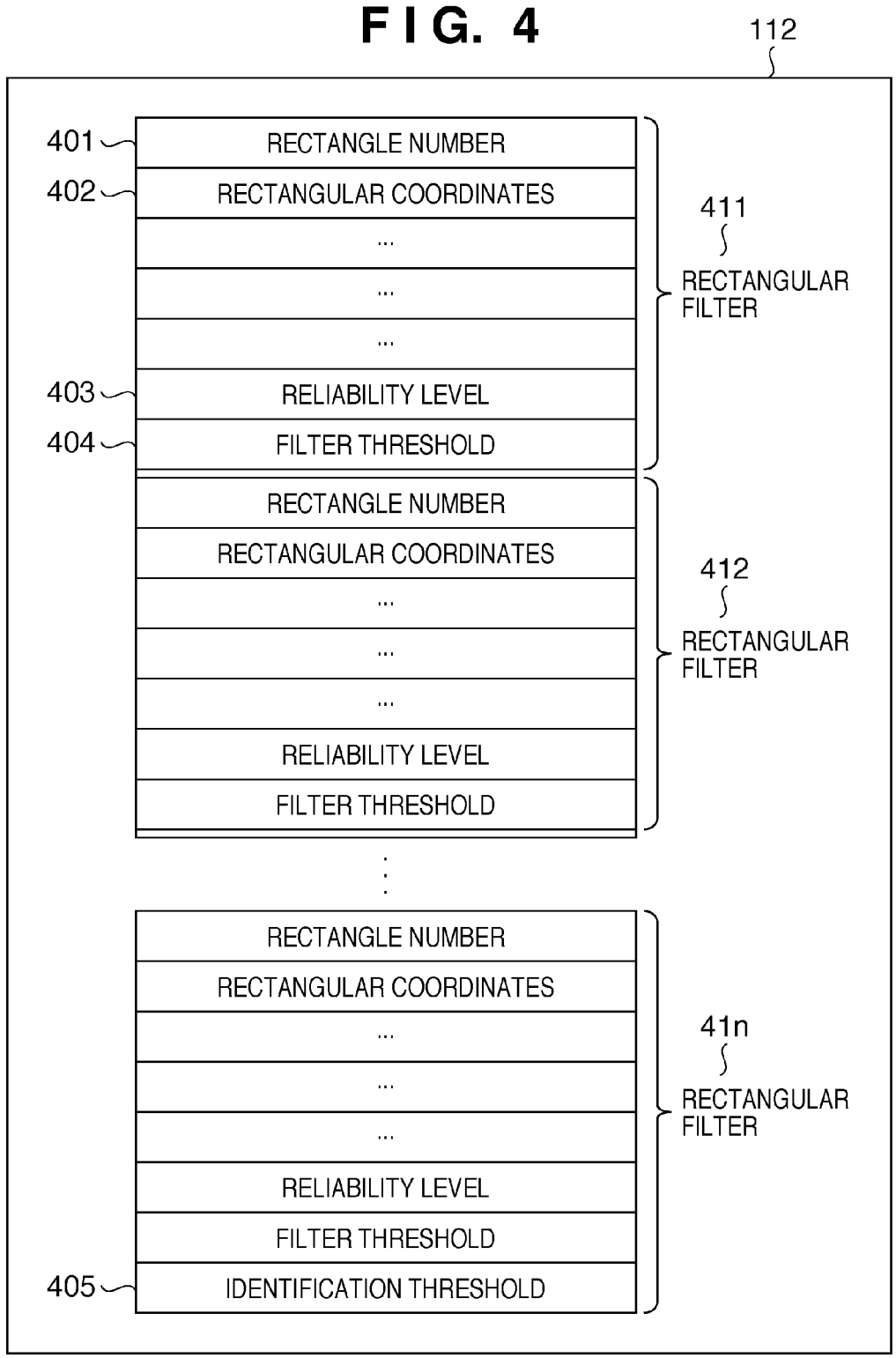
FIG. 4 is a diagram illustrating an example of parameter information.

FIG. 4 is a diagram illustrating an example of parameter information 211 stored in the ROM 205. FIG. 4 illustrates an example of parameter information necessary for the processing in a single stage.

In FIG. 4, rectangular coordinates 402 indicates coordinate data of four vertices corresponding to a single rectangular block. This coordinate data corresponds to the coordinate values within the extraction target object. The rectangular coordinates 402 have coordinate data in groups corresponding to a rectangle number 401.

A filter threshold 404 is a threshold for performing weak classification on the output of the target rectangular filter. Reliability level 403 indicates the reliability level (percent contribution) of the evaluation value that is the result obtained from the target rectangular filter. Each rectangular filter 311 to 31$k$ has, as its output, a value obtained by multiplying the result of weak classification on the result of the rectangular filter computation process using the filter threshold (1 or −1) by the reliability level. An identification threshold 405 is a threshold by which the classification processing unit 320 executes an identification process.

The above parameter information 211 is stored for each of the rectangular filters (thus in FIG. 4, k pieces of parameter information 211 are stored), and is furthermore stored for each of the stages as well.

<Flow of Processing in Pattern Identification Apparatus 100>

Figure 5:
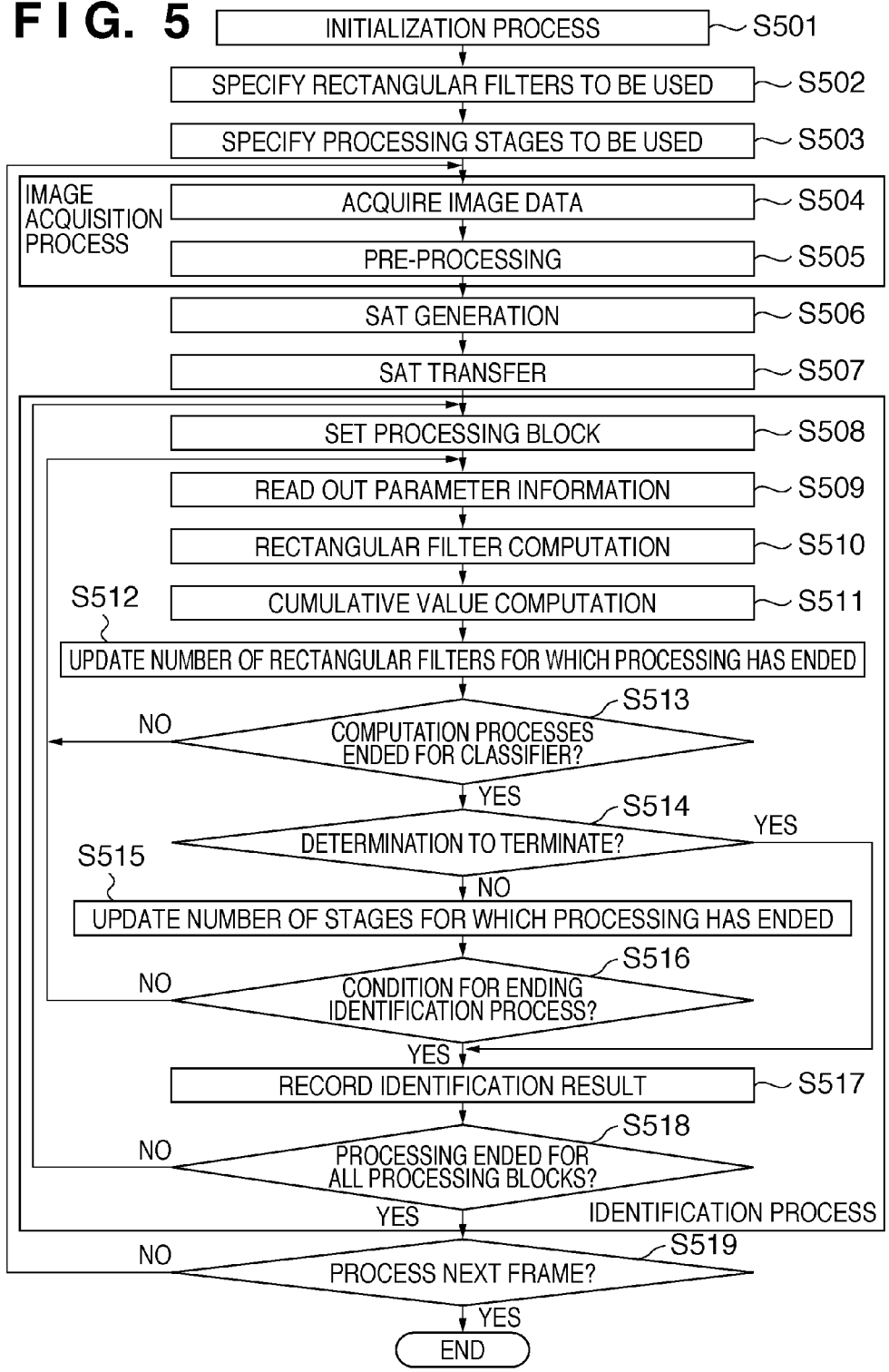
FIG. 5 is a flowchart illustrating operations performed by a pattern identification apparatus according to the first embodiment of the present invention.

Hereinafter, operations performed by the pattern identification apparatus 100 according to the present embodiment shall be described in detail using the flowchart shown in FIG. 5. FIG. 5 illustrates the operations of the CPU 108 and the identification processing unit 103 using a single flowchart. The flow indicated by "identification process" in FIG. 5 (that is, Steps S508 to S518) corresponds to the operations of the identification processing unit 103.

First, in Step S501, the CPU 108 executes various initialization processes prior to commencing the identification process. The internal registers/memories of the various processing units (101 to 103) are initialized in accordance with initialization instructions from the CPU 108.

Then, in Step S502, the rectangular filters to be used in the actual processing are specified, and the details of the rectangular filter processes to be performed in each stage are determined. To be more specific, the number of rectangular filters used in the processing are specified on a stage-by-stage basis.

In Step S503, the stages used for the actual processing are specified. To be more specific, the number of stages used in the processing is specified. Here, the number of rectangular filters and the number of stages used in the processing are determined in accordance with the operational clocks of the pattern identification apparatus 100.

Figure 6:
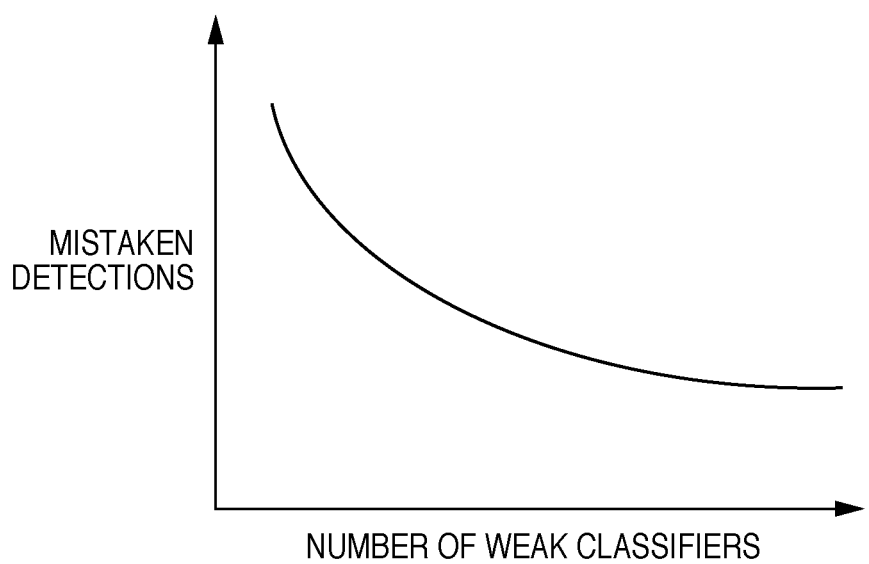
FIG. 6 is a diagram schematically illustrating the relationship between the total number of weak classifiers and the extraction accuracy.

FIG. 6 is a diagram schematically illustrating the relationship between the total number of weak classifiers (rectangular filters) and the extraction accuracy. The total number of weak classifiers indicates the sum of the weak classifiers included in each stage, whereas "misdetection" indicates the degree of mistaken detections.

As shown in FIG. 6, generally speaking, increasing the total number of weak classifiers reduces the misdetections, thereby increasing the extraction accuracy. Meanwhile, because the total number of weak classifiers can be thought of as being generally proportional to the extraction processing time, the tradeoff between the extraction process speed and the extraction accuracy can be adjusted in an extremely easy manner by controlling the total number of weak classifiers.

FIG. 7 is an example of a table that associates operational blocks with the total number of weak classifiers used. In FIG. 7, N1 to N3 indicate the number of stages in the cases of operational clocks 1 to 3, respectively, and $S_{xy}$ (x: clock type; y: stage number) indicates the number of weak classifiers within each stage.

A value that is less than or equal to the number of stages and number of weak classifiers generated through learning is set for each of N1 to N3 and $S_{xy}$. Furthermore, $TH_{xy}$ (x: clock type; y: stage number) is the identification threshold for each stage. Classifiers generated using a learning algorithm with boosting perform identification using a cumulative value indicated by Equation (1).

$$\Sigma_{i=1}^{T} \alpha_i h_i(x) \quad (1)$$

T: number of weak classifiers; $\alpha_i$: reliability level of weak classifier i; $h_i(x)$: determination result for weak classifier output Here, T is the number of weak classifiers that are actually used; in the case where the number of weak classifiers has been reduced, T is the post-reduction number. The value of T may differ from stage to stage.

$\alpha_i$ indicates the reliability of the weak classifiers, and is a value determined through learning of the weak classifiers. $\alpha_i$ can also be called the percent contribution of the weak classifiers with respect to the classifier.

Figure 25:
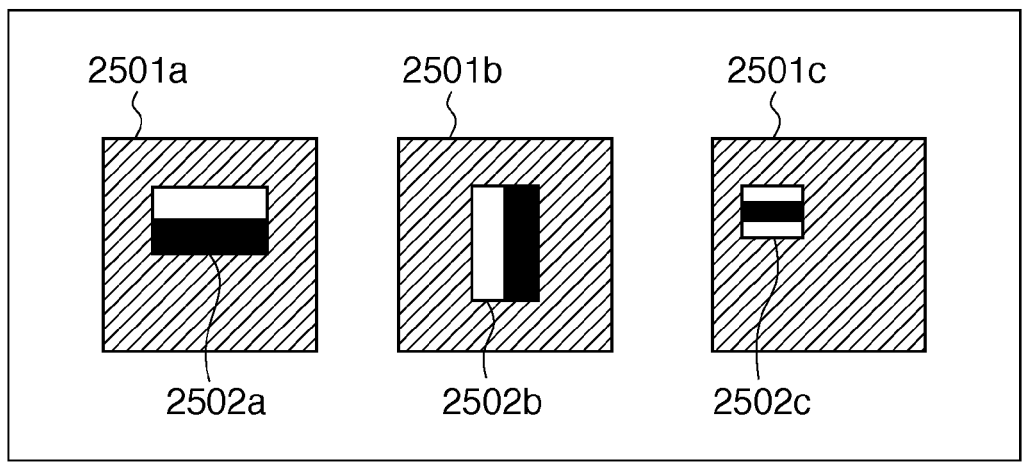
FIG. 25 is a diagram illustrating an example of a rectangular filter for extracting a specific object.

$h_i(x)$ is an evaluation value, which is the output of the weak classifiers, and is the result of weakly classifying the output of the rectangular filters 2502a to 2502c shown in FIG. 25 using a filter threshold (±1 is outputted). In the case where the number of weak classifiers has decreased, the value of T shown in Equation (1) changes compared to the value during learning, and thus it is necessary to prepare a new identification threshold $Th_{xy}$ for each predetermined condition. Note that the identification threshold shown in FIG. 4 is used as-is in the case where the value of T is the same during learning and during execution.

The table shown in FIG. 7 is created in advance using an external workstation or the like, and is stored, in advance, in the ROM 109 or the like. In other words, the table is created so that many weak classifiers are used when the operational clock is high and few weak classifiers are used when the operational clock is low.

Note that the combination of the reduction in the number of stages and the reduction of the weak classifiers within stages may be determined using a conventionally-proposed optimization method or the like. For example, a desired combination may be created in advance based on the relationship between the extraction accuracy and the extraction processing time using a test data set. It is possible to more flexibly determine the tradeoff points by setting the number of stages and the number of weak classifiers within stages independent of each other.

Furthermore, when determining the number of weak classifiers, the number of weak classifiers can be reduced while also suppressing a drop in the extraction accuracy by utilizing the reliability level of the weak classifiers. Weak classifiers with a low reliability level have little influence on the identification, and generally speaking, the reliability level drops toward the later stages. For this reason, in the case where, for example, weak classifiers are included in serially-connected classifiers and the reliability level of weak classifiers included in the latter classifiers is less than or equal to a predetermined value, a method that, for example, reduces all of the multiple classifiers may be used. Using the reliability level makes it possible to achieve an effect in that optimization becomes easy.

In Steps S502 and S503, the table shown in FIG. 7 is referred to, and the number of rectangular filters used in the actual processing, the number of stages, the identification threshold, and so on are set in a register (not shown) included in the processing execution determination unit 203.

When the various settings for the identification process have ended, the image input unit 101 is activated in Step S504, and the pre-processing unit 102 is activated in Step S506. These respective units then perform the following processes.

First, the image input unit 101 stores one frame's worth of image data obtained by the photoelectric conversion device in an internal buffer (not shown).

When this storage ends, the image input unit 101 sends an interrupt to the CPU 108 indicating that the acquisition of the image data has ended. Upon detecting the interrupt, the CPU 108 activates the DMAC 106 and transfers the acquired image data to an internal memory (not shown) in the pre-processing unit 102.

Having received the image data, the pre-processing unit 102 commences the pre-processing. To be more specific, the pre-processing unit 102 executes image data conversion processes, such as a color conversion process, a contrast correction process, and so on based on a pre-set color conversion table, contrast correction information, and the like. The pre-processing unit 102 sends an interrupt signal to the CPU 108 when the image data conversion processes end.

Next, in Step S506, the CPU 108 detects the interrupt signal sent by the pre-processing unit 102, and generates Summed Area Table data (called "SAT data" hereinafter) based on the post-conversion process image data. SAT data is a data format suited to processing rectangular-type filters such as those shown in FIG. 25 at high speed. Note that the SAT data is disclosed in the aforementioned Document 1, and as SAT data is not related to the features of the present invention, detailed descriptions thereof shall be omitted.

Figure 8:
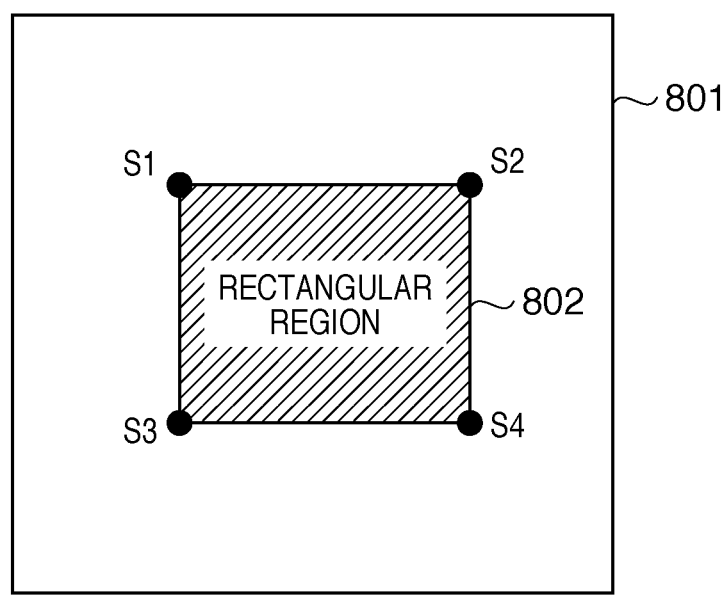
FIG. 8 is a diagram illustrating a method for calculating a rectangular block from SAT data.

FIG. 8 is a diagram illustrating a method for calculating a rectangular block from SAT data. The sum of the data within a rectangular region 802 in an input data region 801 can be calculated through the equation S4+S1−(S2+S3), using the values S1 to S4 of four points within the SAT data region (the same coordinate positions as the input data). By referring to the SAT data, a rectangular filter calculation process can be performed with, for example, six data reads, in the case of the rectangular filter indicated by 2502a in FIG. 25.

In Step S507, the CPU 108 transfers the generated SAT data, storing it in the RAM 204 of the identification processing unit 103 as the image data to be processed. The identification process performed by the identification processing unit 103 is commenced when this transfer of the SAT data to the RAM 204 ends.

<Flow of Identification Process in Identification Processing Unit 103>

Hereinafter, the flow of the identification process (hardware processing) performed by the identification processing unit 103 as indicated in Steps S508 to S518 shall be described.

Figure 26:
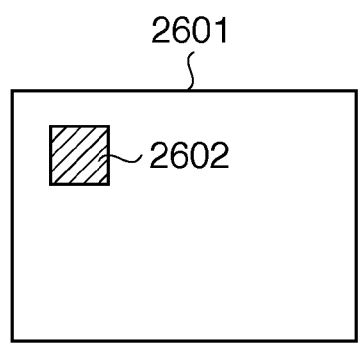
FIG. 26 is a diagram expressing image data to be processed.

In Step S508, a processing block, which will be used as the unit of processing, is specified in the image data stored in the RAM 204. The processing block is the partial image indicated by 2602 in FIG. 26; an extraction target object included in a single frame of image data is extracted by performing the extraction while scanning the window in single-pixel or single-line units.

In Step S509, the rectangular filter computation unit 201 reads out the parameter information 211 from the ROM 205. Then, in Step S510, the rectangular filter computation unit 201 executes the rectangular filter computation process, referring to predetermined image data in the processing block. As described earlier, the rectangular filter computation process calculates a difference value for multiple rectangular filters with respect to the processing block.

Next, in Step S511, the output of the rectangular filter obtained in Step S509 is compared with a rectangular filter threshold stored for that filter in the ROM 205. In the case where the output of the rectangular filter exceeds the filter threshold, an evaluation value obtained by totaling the reliability levels of the rectangular filters is added to the cumulative value for the output of that rectangular filter.

However, in the case where the output of the rectangular filter is less than or equal to the filter threshold, the evaluation value obtained by totaling the reliability levels of the rectangular filters is subtracted from the cumulative value for the output of that rectangular filter.

When a single rectangular filter computation (weak classifier computation) process ends, the process number counter 202 updates the rectangular filter process number counter in Step S512.

Next, in Step S513, it is determined whether the rectangular filter computation process has ended for all weak classifier chains within a single stage. Here, the processing execution determination unit 203 compares the number of rectangular filters specified in Step S502 with the value of the rectangular filter process number counter outputted by the process number counter 202, and determines whether or not the rectangular filter computation processes within the stage has ended.

In the case where it has been determined in Step S513 that the rectangular filter computation processes have not ended for all of the rectangular filters, the procedure returns to Step S509, where the rectangular filter computation process is executed for the next filter.

Meanwhile, in the case where it has been determined in Step S513 that the rectangular filter computation processes have ended for all rectangular filters, the procedure advances to Step S514, where the classification processing unit 320 identifies the cumulative value and determines whether or not to terminate the stage.

Here, it is determined whether or not an extraction target object is present in the processing block by comparing the cumulative value with the identification threshold 405 set in Step S502. In the case where the result of the identification performed by the classification processing unit 320 indicates that the extraction target object is not present, the identification process is terminated.

When terminating the identification process, the fact that the extraction target object is not present in that processing block (that is, that the object is not an extraction target object) is recorded in Step S517.

However, in the case where the result of the identification performed by the classification processing unit 320 indicates that the extraction target object is present, the procedure advances to Step S515, where the stage number counter of the process number counter 202 is updated.

In Step S516, the processing execution determination unit 203 compares the stage process number counter with the number of stages specified in Step S503. In the case where it is determined, based on the result of the comparison performed in Step S516, that the specified stage number has not been reached, the procedure returns to Step S509, where the rectangular filter computation processes for the next stage are commenced.

However, in the case where it is determined, based on the result of the comparison performed in Step S516, that the specified stage number has been reached, the procedure advances to Step S517, where it is recorded that the extraction target object is present in that processing block.

In Step S518, it is determined whether or not the identification process has been executed for all processing blocks within the image data to be processed. In the case where it has been determined that the identification process has not ended for all processing blocks within the image data to be processed, the procedure returns to Step S508, where a processing block adjacent by one pixel or one line is selected, and the same process is repeated thereon.

However, in the case where it has been determined in Step S518 that the identification process has ended for all processing block in the image data to be processed, the procedure advances to Step S519, where it is determined whether or not to execute the identification process on the image data of the next frame. In the case where the identification process is to be executed on the image data of the next frame, the procedure returns to Step S504, and the processing from Step S504 to Step S518 is repeated. However, the processing ends in the case where it has been determined that the identification process is not to be executed on the image data of the next frame.

As described thus far, the present embodiment has a configuration in which the number of weak classifiers and the number of stages (this corresponds to a number indicating the processing order) to be used are specified in accordance with the operational clock of the pattern identification apparatus that executes the identification process. Accordingly, the pattern identification apparatus that executes the identification process does not execute a rectangular filter computation process for stages that come after the specified number of stages when carrying out the identification process.

In other words, even when the identification processing unit is installed in multiple embedded devices having different specifications, the extraction accuracy and extraction process speed can be adjusted in accordance with the operational clocks of the embedded devices by using this configuration, in which the number of weak classifiers can be controlled in accordance with the operational clock.

(Second Embodiment)

Although the above first embodiment describes a configuration in which the tradeoff between the extraction accuracy and the extraction process speed is adjusted by specifying the number of weak classifiers or the number of stages used, the present invention is not limited thereto. For example, a configuration in which the tradeoff between the extraction accuracy and the extraction process speed is adjusted by specifying whether or not to execute each individual weak classifier based on the reliability level may be used.

Hereinafter, the details of a pattern identification apparatus according to the present embodiment, used for adjusting the tradeoff between the extraction accuracy and the extraction process speed, shall be described. It should be noted that the hardware configuration of the pattern identification apparatus according to the present embodiment, the details of the configuration of the rectangular filter computation unit 201, the configuration of the parameter information 211, and so on are the same as those described in the above first embodiment, and therefore descriptions thereof shall be omitted here.

Figure 9:
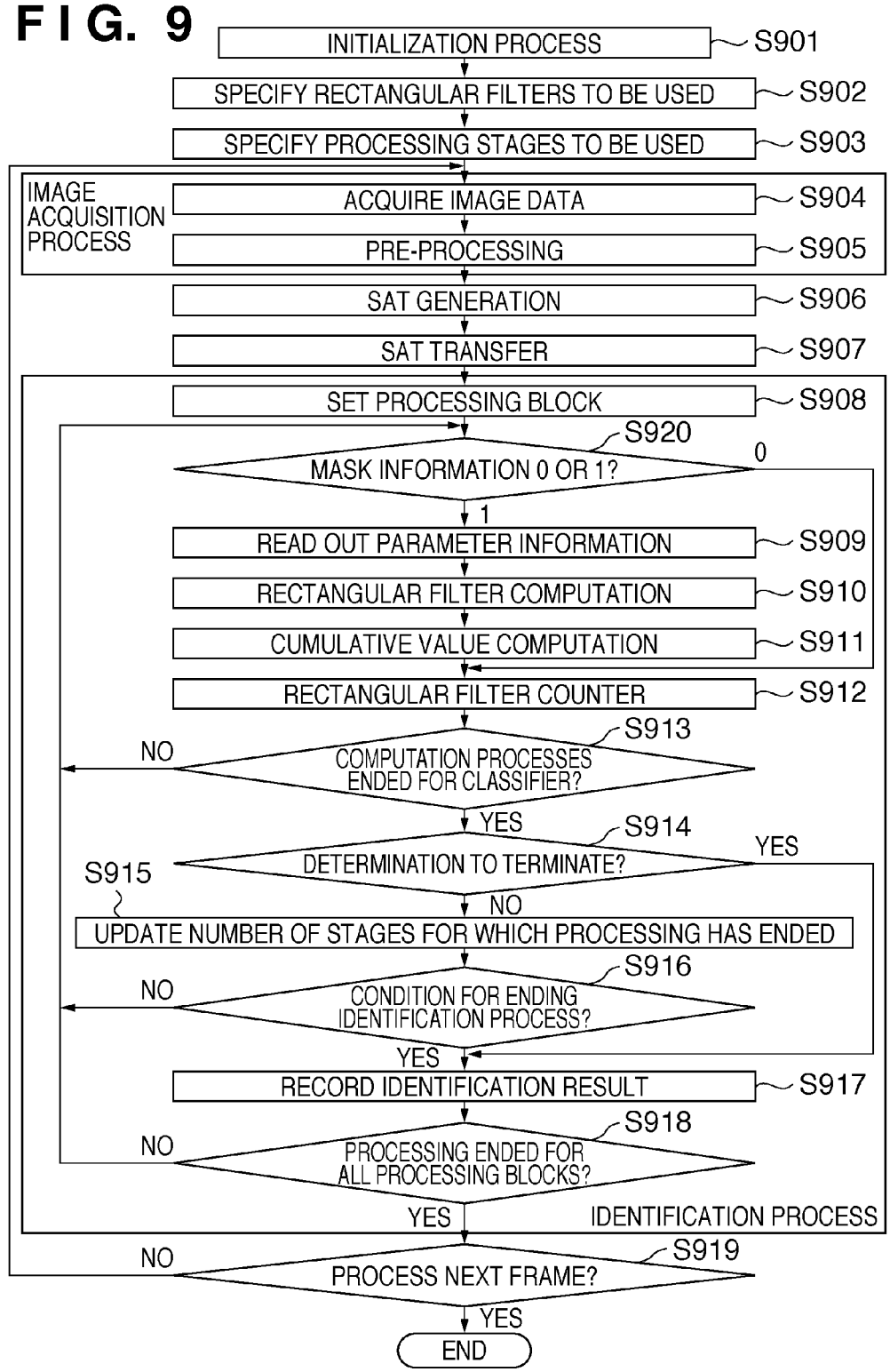
FIG. 9 is a flowchart illustrating operations performed by a pattern identification apparatus according to a second embodiment of the present invention.

FIG. 9 is a flowchart illustrating operations performed by the pattern identification apparatus 100 according to the second embodiment of the present invention. Only items that differ from those in the first embodiment shall be described here.

Figure 10:
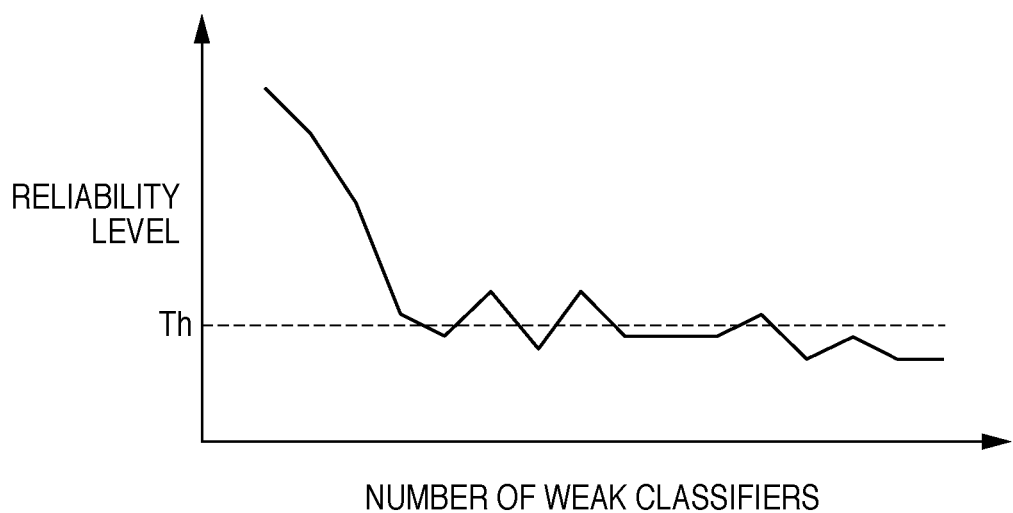
FIG. 10 is a diagram schematically illustrating the relationship between the number of weak classifiers obtained using a learning algorithm with boosting and the reliability level of the corresponding weak classifiers.

In Step S902, the weak classifiers to be used are determined. FIG. 10 is a diagram schematically illustrating the relationship between the number of weak classifiers obtained using a learning algorithm with boosting and the reliability level of the corresponding weak classifiers.

Generally speaking, increasing the number of weak classifiers leads to a decrease in the corresponding reliability level of the weak classifiers, but this decrease is not constant; rather, the decrease fluctuates up and down, resulting in an average decrease.

Accordingly, in Step S902, when determining the weak classifiers to be used, the weak classifiers are set through classification based on a predetermined reliability level. For example, in the case shown in FIG. 10, weak classifiers having reliability levels that exceed a threshold Th are used in the actual processing, and weak classifiers less than or equal to Th are not used for the rectangular filter computation process.

By specifying the weak classifiers to be used in such a manner, it is possible to specify weak classifiers with higher reliability levels (classifiers with higher percent contribution) compared to the case of uniformly determining the weak classifiers to be used based on the number of processes, as in the first embodiment.

Here, the reliability level of a weak classifier chain generated through learning is determined, and mask information that specifies weak classifiers that fulfill predetermined conditions as "weak classifiers to be used" and specifies weak classifiers that do not fulfill predetermined conditions as "weak classifiers not to be used" is generated in advance. In other words, the "mask information" discussed here is information that denotes whether or not a weak classifier is to be used.

FIG. 11 is a diagram illustrating an example of a table that associates operational clocks with the total number of weak classifiers used. In FIG. 11, N1 to N3 and $Th_{xy}$ (x: clock type; y: stage number) are the same variables as in the first embodiment. $M_{xy}$ (x: clock type; y: stage number) is the mask information specifying whether or not each weak classifier is to execute processing, and is expressed as a binary bit string. An example of $M_{xy}$ is shown below. The example shown here is for a case where whether or not each of 32 weak classifiers is to execute processing is allocated in ascending order starting with the MSB (Most Significant Bit).

M11=11111111111111111010100101010000

With respect to each bit, weak classifiers to which 1 is allocated are actually used in the rectangular filter computation processes, whereas weak classifiers to which 0 is allocated are not used during the rectangular filter computation processes. For example, the first weak classifier is used in the rectangular filter computation processes, whereas the thirty-second weak classifier is not used.

In Step S902, a predetermined $M_{xy}$ is selected in accordance with the operational clock and is set in a register (not shown) in the processing execution determination unit 203.

The processes indicated by Steps S903 to S907 are the same as the processes indicated by Steps S703 to S707 in FIG. 7, and thus descriptions thereof shall be omitted.

Furthermore, with respect to the operations of the identification processing unit 103, processes indicated by Steps S908 to S919, only the processes that are different from those indicated by Steps S708 to S719 in FIG. 7 shall be described.

In Step S920, the processing execution determination unit 203 determines the weak classifiers to be used. The processing execution determination unit 203 determines whether or not a weak classifier is to be used in the rectangular filter computation process based on the rectangular filter process number counter counted by the process number counter 202 and the mask information $M_{xy}$ set in Step S902.

In other words, the corresponding bit position in $M_{xy}$ is determined based on the value of the rectangular filter process number counter, and it is then determined whether the value of that bit is 0 or 1. In the case where it has been determined that the value of the bit position corresponding to the value of the rectangular filter process number counter is 1, that weak classifier is determined to be a "weak classifier to be used", and the rectangular filter computation process and weak classification process are executed in Steps S909 to S911.

In Step S912, the rectangular filter process number counter is updated regardless of whether or not the weak classifier was used. In Step S913, it is then determined whether or not the rectangular filter computation process has ended for all weak classifier chains within a single stage. This determination is carried out based on a comparison between the number of weak classifiers generated in advance through learning and the rectangular filter process number counter.

The processes in the following Steps S913 to S919 are the same as the processes in Steps S513 to S519 in FIG. 5, and thus descriptions thereof shall be omitted.

As described thus far, the present embodiment has a configuration in which the number of weak classifiers to be used is specified in accordance with the operational clock of the pattern identification apparatus that executes the identification process. Through this, even when the identification processing unit, which is implemented through hardware as a common device, is installed in multiple embedded devices having different specifications, the extraction accuracy and extraction process speed can be adjusted in accordance with the operational clocks of the embedded devices.

Furthermore, the present embodiment has a configuration in which, when specifying the weak classifiers to be used, the specification is carried out in accordance with the reliability levels of the weak classifiers. This makes it possible to suppress a drop in the extraction accuracy more so than in the above first embodiment.

(Third Embodiment)

Although the above first and second embodiments describe adjusting the tradeoff between the extraction accuracy and the extraction process speed by changing the number of weak classifiers to be used in accordance with the operational clock of the pattern identification apparatus, the present invention is not limited thereto. For example, the tradeoff between the extraction accuracy and the extraction process speed may be adjusted by dynamically changing the number of weak classifiers to be used in accordance with the extraction state of the extraction target object.

Hereinafter, the details of a pattern identification apparatus according to the present embodiment, used for adjusting the tradeoff between the extraction accuracy and the extraction process speed, shall be described. It should be noted that the hardware configuration of the pattern identification apparatus according to the present embodiment, the details of the configuration of the rectangular filter computation unit 201, the configuration of the parameter information 211, and so on are the same as those described in the above first embodiment, and therefore descriptions thereof shall be omitted here.

Figure 12:
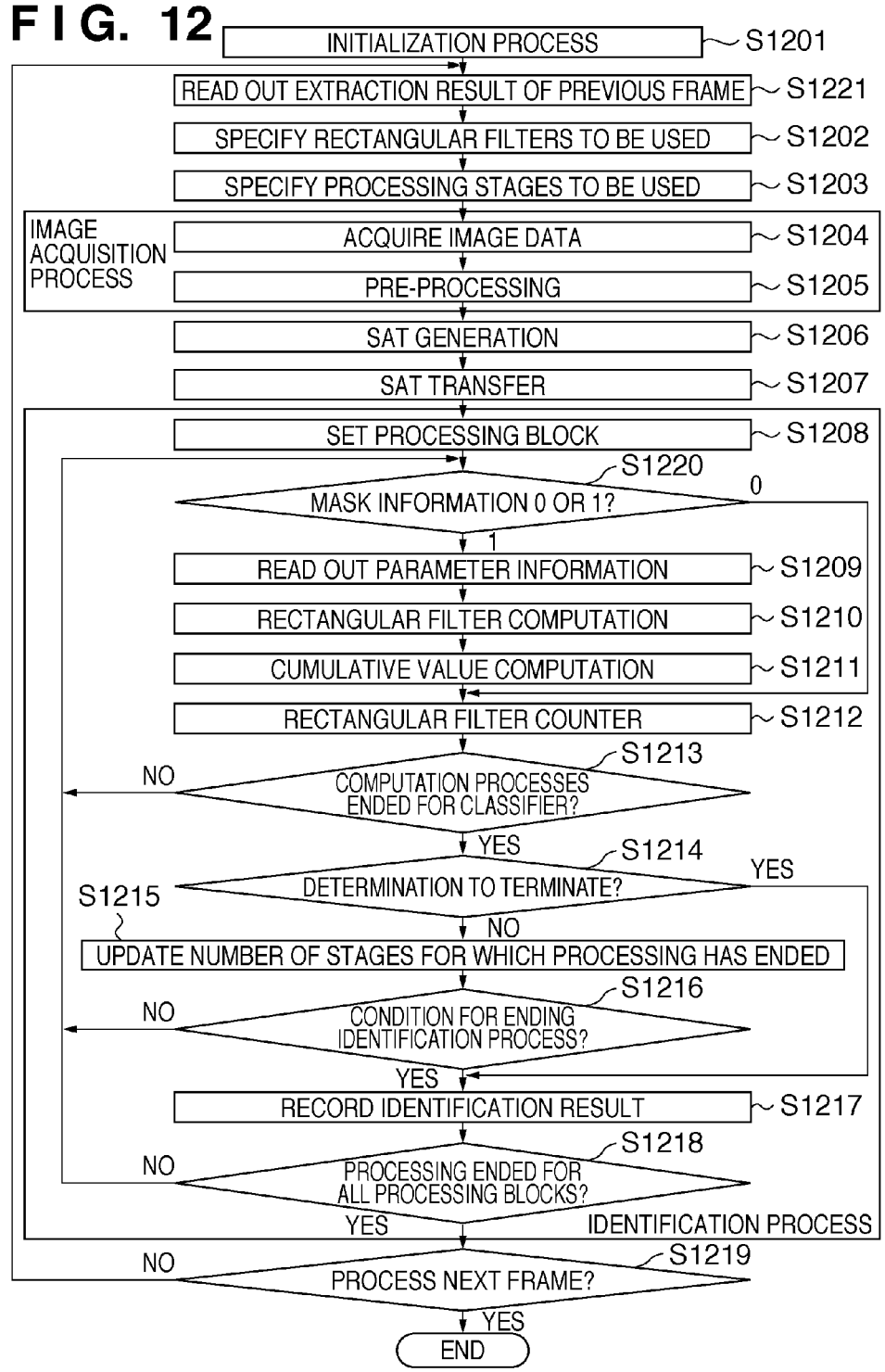
FIG. 12 is a flowchart illustrating operations performed by a pattern identification apparatus according to a third embodiment of the present invention.

FIG. 12 is a flowchart illustrating operations performed by a pattern identification apparatus 100 according to the third embodiment of the present invention. For the sake of simplicity, only the differences from the second embodiment shall be described hereinafter.

The processes indicated by Steps S1201 to S1220 are the same as the processes indicated by Steps S901 to S920 in FIG. 9. However, the processes in Steps S1202, S1203, and S1217 have different processing details from those of Steps S902, S903, and S917, respectively, shown in FIG. 9.

In Step S1221, the number of extraction target objects that have been extracted in the previous frame is read out. Then, in Steps S1202 and S1203, the number of weak classifiers and number of stages to be used are determined based on the number of extraction target objects in the previous frame, read out as described here. For example, in the case where the number of extraction target objects that have been extracted in the previous frame is high, the number of weak classifiers to be used is reduced.

FIG. 13 is a diagram illustrating an example of a table, held by the pattern identification apparatus of the present embodiment, that associates the extracted number of extraction target objects in the previous frame with the total number of weak classifiers used. In FIG. 13, N1 to N3 and $Th_{xy}$ (x: clock type; y: stage number) and $M_{xy}$ (x: clock type; y: stage number) correspond to the variables indicated in FIG. 11 in the second embodiment.

Three parameters, corresponding to the extracted number of extraction target objects in the previous frame, are stored in the table shown in FIG. 13. D1 and D2 in FIG. 13 correspond to the number of extraction target objects that have been extracted. The present embodiment is configured so that the total number of weak classifiers decreases when the number of extraction target objects that have been extracted is high. Note that the table shown in FIG. 13 is stored in the ROM 109.

In Steps S1202 and S1203, the number of extraction target objects that have been extracted in the previous frame (Step S1221) is compared with the conditions denoted in the table (D1, D2). Through this, the number of stages and so on to be used is changed.

In other words, when the number of extraction target objects has changed, the total number of weak classifiers corresponding thereto and the parameters (N1 to N3, $TH_{xy}$, and $M_{xy}$) are set in the register in the processing execution determination unit 203 in Steps S1202 and S1203.

The identification process is executed in Steps S1204 to S1220 in accordance with the parameters set here.

Although the processes in Steps S1204 to S1220 are equivalent to the processes in Steps S904 to S920 in the second embodiment, the present embodiment differs in that the number of extraction target objects that have been extracted is counted in Step S1217.

In Step S1217, the recorded number of extraction target objects (a post-frame processing count value) is read out and used in Step S1221 during the identification process for the next frame. That counter is reset after its value is read out in Step S1221.

As described thus far, the present embodiment has a configuration in which the number of weak classifiers to be used is dynamically changed in accordance with the results of the extraction from the previous frame. Through this, a highly-accurate extraction using many weak classifiers is executed when the number of extraction target objects that have been extracted in the previous frame is low. Meanwhile, the number of weak classifiers is reduced and processing is executed with priority on the extraction process speed when the number of extraction target objects that have been extracted in the previous frame is high. As a result, a proper extraction process can be implemented even in the case where it is necessary to execute the extraction process on a moving image in real time within a predetermined amount of time.

(Fourth Embodiment)

Although the above third embodiment describes adjusting the tradeoff between the extraction accuracy and the extraction process speed by changing the number of weak classifiers to be used in accordance with the extraction results from the previous frame, the present invention is not limited thereto. For example, the tradeoff between the extraction accuracy and the extraction process speed may be adjusted by changing the number of weak classifiers to be used in accordance with the extraction state of the current frame being processed.

The configuration of a pattern identification apparatus according to the present embodiment shall be described hereinafter. It should be noted that the hardware configuration of the pattern identification apparatus according to the present embodiment, the details of the configuration of the rectangular filter computation unit 201, the configuration of the parameter information 211, and so on are the same as those described in the above first embodiment, and therefore descriptions thereof shall be omitted here.

Figure 14:
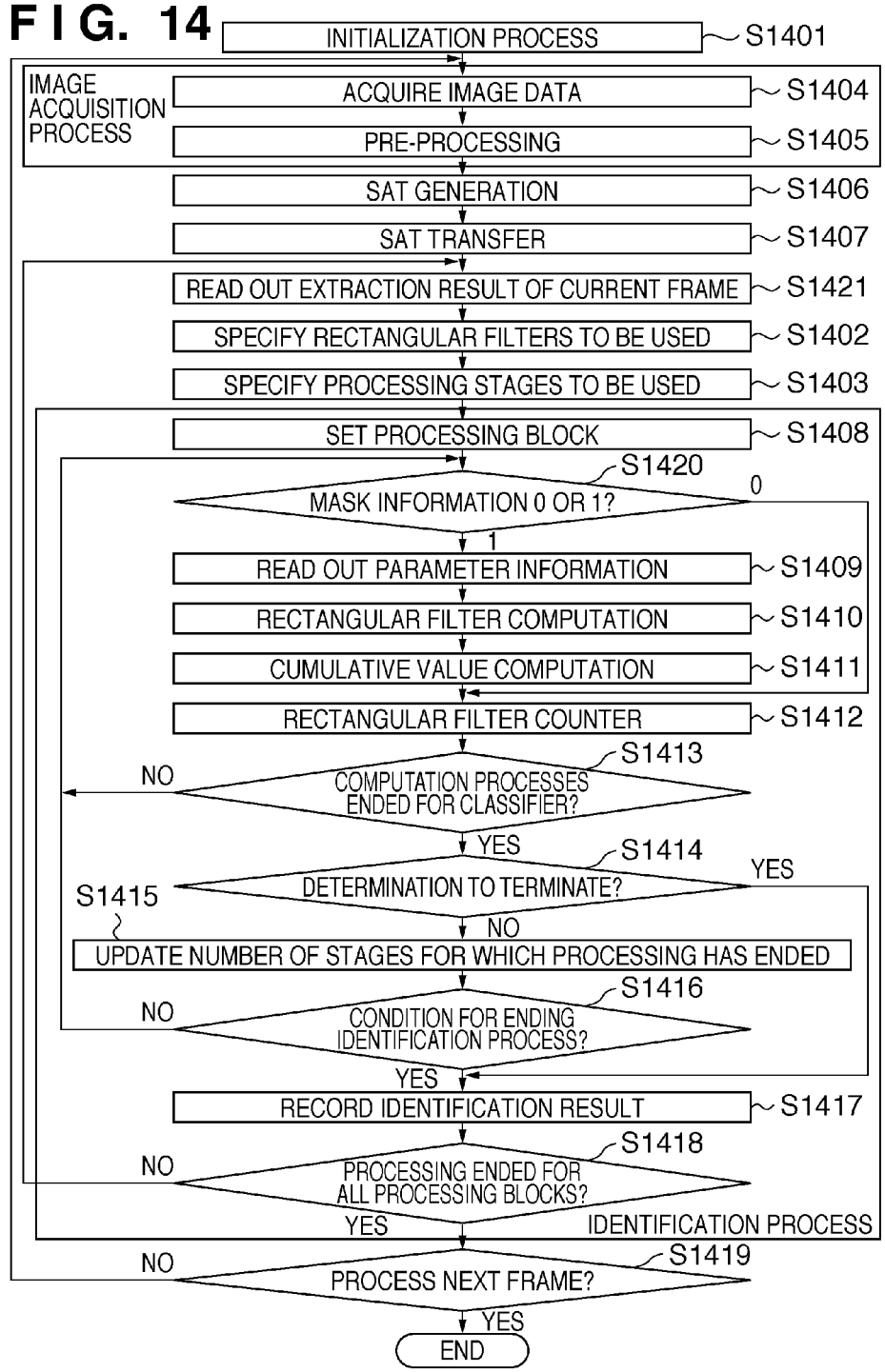
FIG. 14 is a flowchart illustrating operations performed by a pattern identification apparatus according to a fourth embodiment of the present invention.

FIG. 14 is a flowchart illustrating operations performed by a pattern identification apparatus 100 according to the fourth embodiment of the present invention. For the sake of simplicity, only the differences from the third embodiment shall be described hereinafter.

The processes indicated by Steps S1401 to S1421 are generally equivalent to the processes indicated by Steps S1201 to S1221 in FIG. 12; however, in the present embodiment, the order of the processes and the processing details on Step S1421 are different. When SAT data is stored in the RAM 204 as image data to be processed in Steps S1404 to S1407, the identification process is commenced for the frame to be processed.

In Step S1421, the number of extraction target objects that have been extracted up until the present time is read out. The read-out value is a counter value that is incremented in Step S1417 with each extraction of an extraction target object. Note that this counter is initialized when the first processing block in the frame is processed in Step S1421.

In Steps S1402 and S1403, the weak classifiers to be used are determined in accordance with the read-out count value (the number of extraction target objects that have been extracted in the frame). The determination of the weak classifiers is carried out by referring to the table shown in FIG. 13, in the same manner as in the third embodiment.

In other words, it is determined whether or not a change has occurred in the conditions shown in the table, and in the case where a change has been determined to have occurred, the corresponding parameters are set in Steps S1402 and S1403.

In Steps S1408 to S1418, the identification process is executed on the processing block, and in the case where an extraction target object has been extracted, the counter that counts the number of extractions is updated in Step S1417. When the processing for the processing block, which is a partial image, ends, the number of weak classifiers to be used is re-set in Steps S1421, S1402, and S1403, based on the table.

As described thus far, in the present embodiment, the number of weak classifiers is re-set in processing blocks units, the processing blocks being partial images. In other words, the number of weak classifiers is dynamically changed in processing block units based on the number of extraction target objects that have been extracted in the currently-processed frame. Through this, in the case where the number of extraction target objects within the currently-processed frame has increased and there is a chance that there will be no leeway in terms of extraction processing time, it is possible to reduce the number of weak classifiers and place priority on shortening the extraction processing time when processing the subsequent processing blocks.

As a result, a proper identification process can be executed even in the case where it is necessary to execute the identification process on a moving image in real time within a predetermined amount of time.

(Fifth Embodiment)

Although the above first and second embodiments describe adjusting the tradeoff between the extraction accuracy and the extraction process speed by changing the number of weak classifiers to be used in accordance with the operational clock, the present invention is not limited thereto. For example, a configuration that changes the number of weak classifiers used in the processing in accordance with an image capturing mode specified by a user may be used.

Hereinafter, the details of the configuration of a pattern identification apparatus according to the present embodiment, used for adjusting the tradeoff between the extraction accuracy and the extraction process speed, shall be described. It should be noted that the hardware configuration of the pattern identification apparatus according to the present embodiment, the details of the configuration of the rectangular filter computation unit 201, the configuration of the parameter information 211, and so on are the same as those described in the above first embodiment, and therefore descriptions thereof shall be omitted here.

In addition, descriptions of the operation of the pattern identification apparatus 100 shall be carried out using the flowchart in the above second embodiment (FIG. 9).

Figure 15:
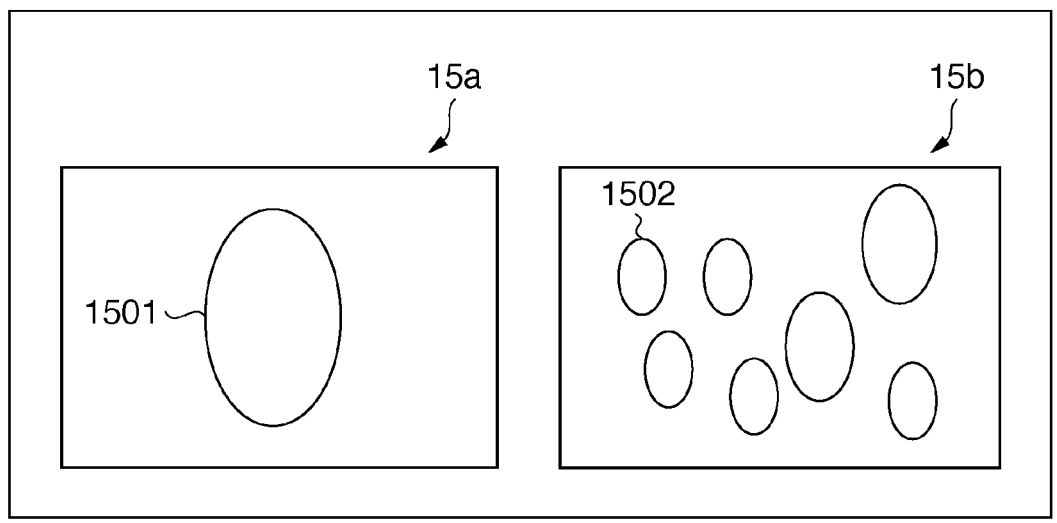
FIG. 15 is a diagram illustrating an image capturing mode.

With a camera, it is generally possible to set multiple image capturing modes in accordance with the subject to be shot. FIG. 15 is a diagram illustrating an example of such an image capturing mode, and illustrates typical compositions used when shooting in a portrait mode, indicated by 15a, and a standard mode, indicated by 15b.

1501 and 1502 schematically express the subjects. In the portrait mode, few subjects 1501 are shot at a comparatively large size, and the background behind the subject is blurred in the shooting (for example, the optical system of the image input unit 101 is controlled to reduce the depth of field).

It is therefore possible to predict the composition to some degree based on the image capturing mode. In other words, it is possible to predict the number of extraction target objects in the case where the subject is to be detected from the composition. For example, because the number of subjects is low and the background region is blurry in the portrait mode, the number of extraction target objects to be extracted is low.

In the present embodiment, the tradeoff between the extraction accuracy and the extraction process speed is adjusted based on this viewpoint. To be more specific, in the case where a user has specified an image capturing mode using the I/F unit 111, the number of weak classifiers to be actually used is determined in Steps S902 and S903 based on the specified image capturing mode.

FIG. 16 is a diagram illustrating an example of a table that associates image capturing modes with the total number of weak classifiers used; this table is used when determining the weak classifiers to be used in Steps S902 and S903.

N1 to N2 and $Th_{x,y}$ (x: clock type; y: stage number) and $M_{x,y}$ (x: clock type; y: stage number) are the same as in the table described in the second embodiment (FIG. 11). In this case, N1>N2, and 1 or the like is specified for all bits in $M_{1,y}$.

In other words, when using the portrait mode, identification is performed using more weak classifiers (all weak classifiers generated in advance through learning), whereas the number of weak classifiers is reduced in all other cases. Note that this table is stored in the ROM 109. In the other steps, the identification process is executed in accordance with the conditions set here. These other steps are the same as those in the second embodiment and thus descriptions thereof shall be omitted.

As described thus far, the present embodiment has a configuration in which a highly-accurate identification process using all the weak classifiers determined during learning is performed in the portrait mode, and the number of weak classifiers is reduced and a fast process is performed in the standard mode.

Through this, it is possible to control the number of weak classifiers used in accordance with the image capturing mode, and thus possible to suitably adjust the tradeoff between the extraction accuracy and the extraction process speed.

(Sixth Embodiment)

Although the above fifth embodiment describes a configuration in which the number of weak classifiers to be used is controlled in accordance with the image capturing mode, the present invention is not limited thereto. For example, a configuration that changes the number of weak classifiers to be used in accordance with an operational mode specified by a user may be used.

Depending on the operational mode of the image capturing apparatus, there are cases where the extraction target object is extracted in real time in parallel with the generation of image data, and cases where the extraction target object is not extracted in real time from image data that has been stored in a storage unit of the image capturing apparatus after the generation of the image data. In general, the former is called an online mode, and the latter is called an offline mode. The online mode corresponds to imaging operations, whereas the offline mode corresponds to, for example, an operational mode where some kind of editing, queries, or the like is to be performed on post-imaging image data.

For this reason, the extraction process speed is given priority in the online mode, whereas the extraction accuracy is given priority in the offline mode. In the present embodiment, the number of weak classifiers to be used is controlled in accordance with the operational mode of the pattern identification apparatus in such a manner. Note that the operations of the present embodiment shall also be described using the flowchart of the second embodiment (FIG. 9).

To be more specific, in the case where a user has specified an operational mode using the I/F unit 111, the number of weak classifiers to be used is determined in accordance with the specified operational mode in Steps S902 and S903.

FIG. 17 is a diagram illustrating an example of a table that associates operational modes with the total number of weak classifiers used; this table is used when determining the weak classifiers to be used in Steps S902 and S903.

N1 to N2 and $Th_{xy}$ (x: clock type; y: stage number) and $M_{xy}$ (x: clock type; y: stage number) are the same as in the table described in the second embodiment (FIG. 11).

In FIG. 17, parameters are set so that the identification process is performed using all the weak classifiers generated during learning when in the offline mode, and is performed with a reduced number of weak classifiers when in the online mode. Note that this table is stored in the ROM 109. In the other steps, the identification process is executed in accordance with the conditions set here. These other steps are the same as those in the second embodiment and thus descriptions thereof shall be omitted.

As described thus far, the present embodiment has a configuration in which a highly-accurate identification process using all the weak classifiers determined during learning is performed in the offline mode, and the number of weak classifiers is reduced and a fast identification process is performed in the online mode.

Through this, it is possible to control the number of weak classifiers used in accordance with the operational mode, and thus possible to suitably adjust the tradeoff between the extraction accuracy and the extraction process speed.

(Seventh Embodiment)

The above first through sixth embodiments have a configuration in which the parameter information 211 that defines the operations of the weak classifier is stored in the ROM 205 when adjusting the tradeoff between the extraction accuracy and the extraction process speed. However, the present invention is not limited thereto.

In the present embodiment, a case where the parameter information that defines the operations of the weak classifiers is stored between an unchangeable storage unit (for example, a ROM) and a changeable storage unit (for example, a RAM) shall be described.

Figure 18:
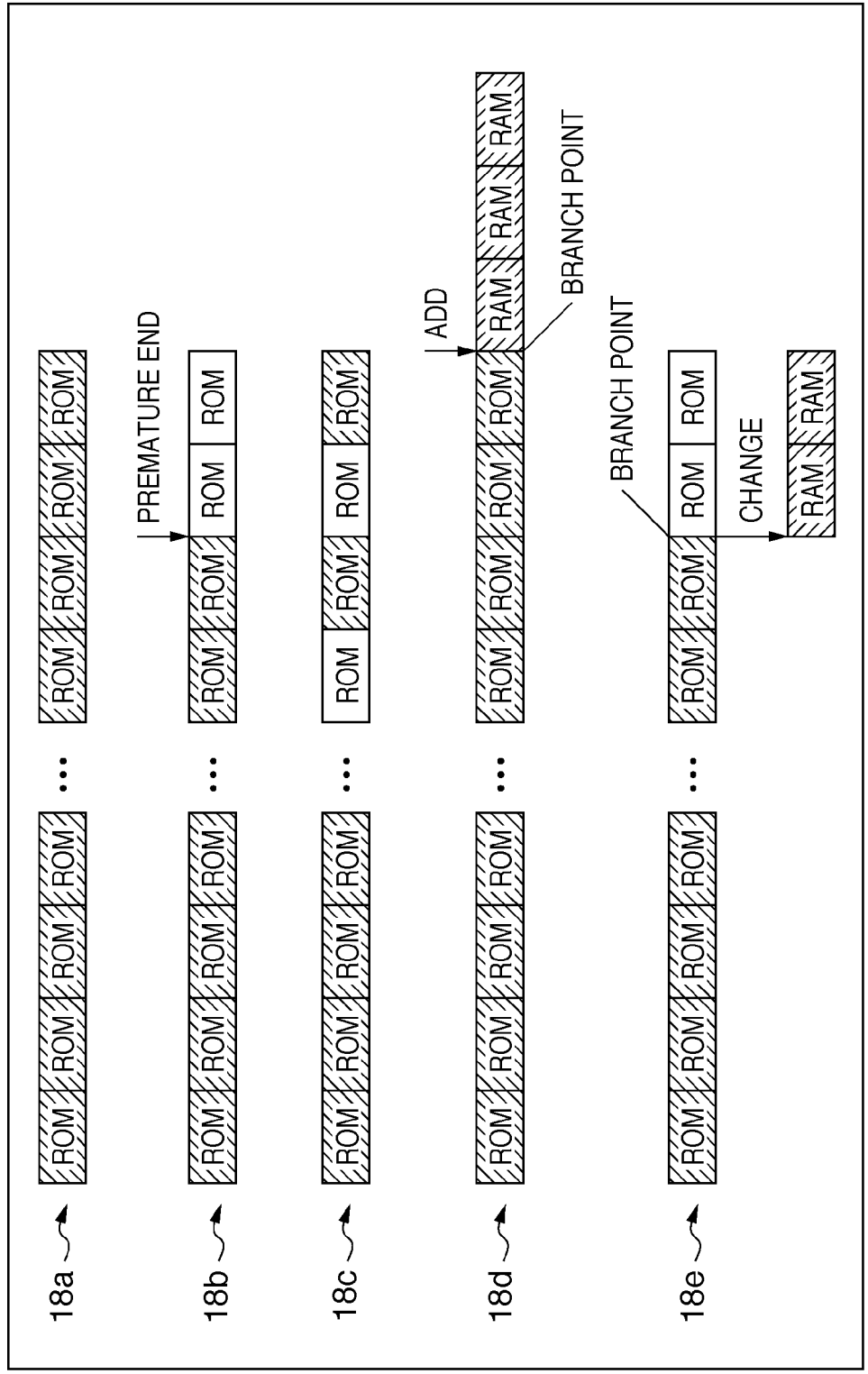
FIG. 18 is a diagram schematically illustrating parameter information that defines the operations of weak classifiers and the usage status thereof.

FIG. 18 is a diagram schematically illustrating parameter information, stored in the ROM 205 and the RAM 204, that defines the operations of weak classifiers, and the usage status thereof. 18a in FIG. 18 illustrates a state where the parameter information of weak classifiers generated through learning is stored in the ROM 205.

Each box indicates a parameter information data set that defines a single rectangular filter, stored in a predetermined region in the ROM 205. In other words, the parameter information for a single rectangular filter indicated in FIG. 4 is stored in a single box. The parameter information for multiple rectangular filters to be processed in order is stored in the order in which the boxes are arranged, starting from the left.

18b in FIG. 18 indicates the actual operations of the weak classifiers as described in the first embodiment. Each hashed box indicates that the rectangular filter corresponding to that box is a rectangular filter that is used in the actual processing. In this case, the number of weak classifiers (rectangular filters) is controlled by prematurely ending the chain of rectangular filters generated through learning.

18c in FIG. 18 indicates the actual operations of the weak classifiers as described in the second embodiment. In this case, the number of weak classifiers (rectangular filters) actually used is controlled by performing processing that skips specific rectangular filters that have low reliability levels.

The operations indicated by 18d and 18e in FIG. 18 represent the features of the present embodiment. In other words, in this configuration, the parameter information for configuring the rectangular filters is held not only in the ROM 205, but also in the RAM 204. Furthermore, the rectangular filter computation processing is executed using the parameter information stored in the RAM 204 after a predetermined position (called a "branching point" hereinafter) or in a predetermined section.

Figure 19:
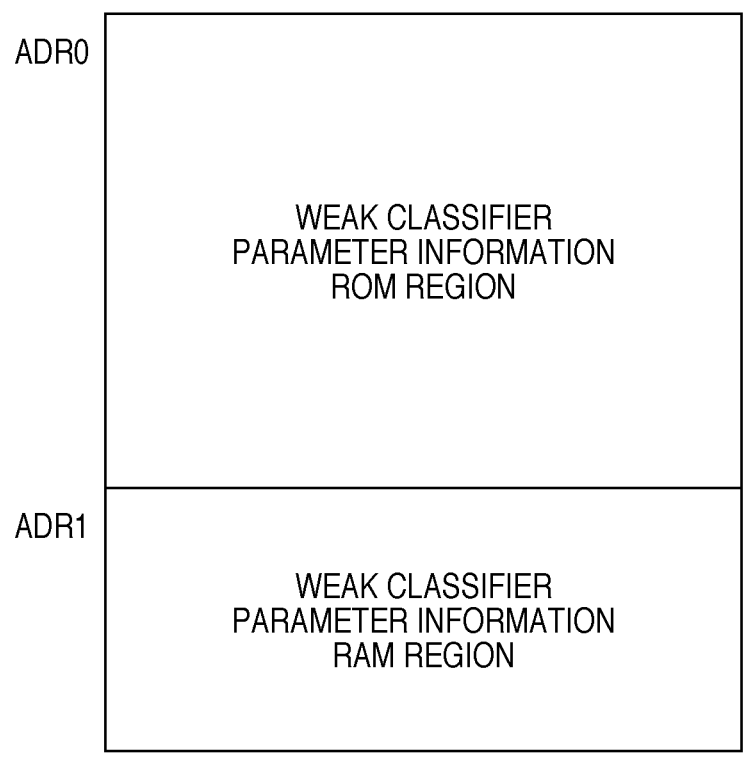
FIG. 19 is a diagram illustrating an example of a memory map.

FIG. 19 is a diagram illustrating an example of a memory map for the ROM 205 and the RAM 204, as viewed from the rectangular filter computation unit 201. The parameter information generated in advance through learning is stored in the range from ADR0 to (ADR1-1).

Meanwhile, the addresses from ADR1 and on are secured by the RAM 204, making it possible to store additional parameter information and the like for improving the performance of the pattern identification apparatus after the apparatus has been shipped. In the case where the parameter information referred to is changed from the ROM 205 to the RAM 204, the address value of the RAM 204 region (that is, the value after ADR1) is set in a pointer register, which shall be described later, at this branching point.

Figure 20:
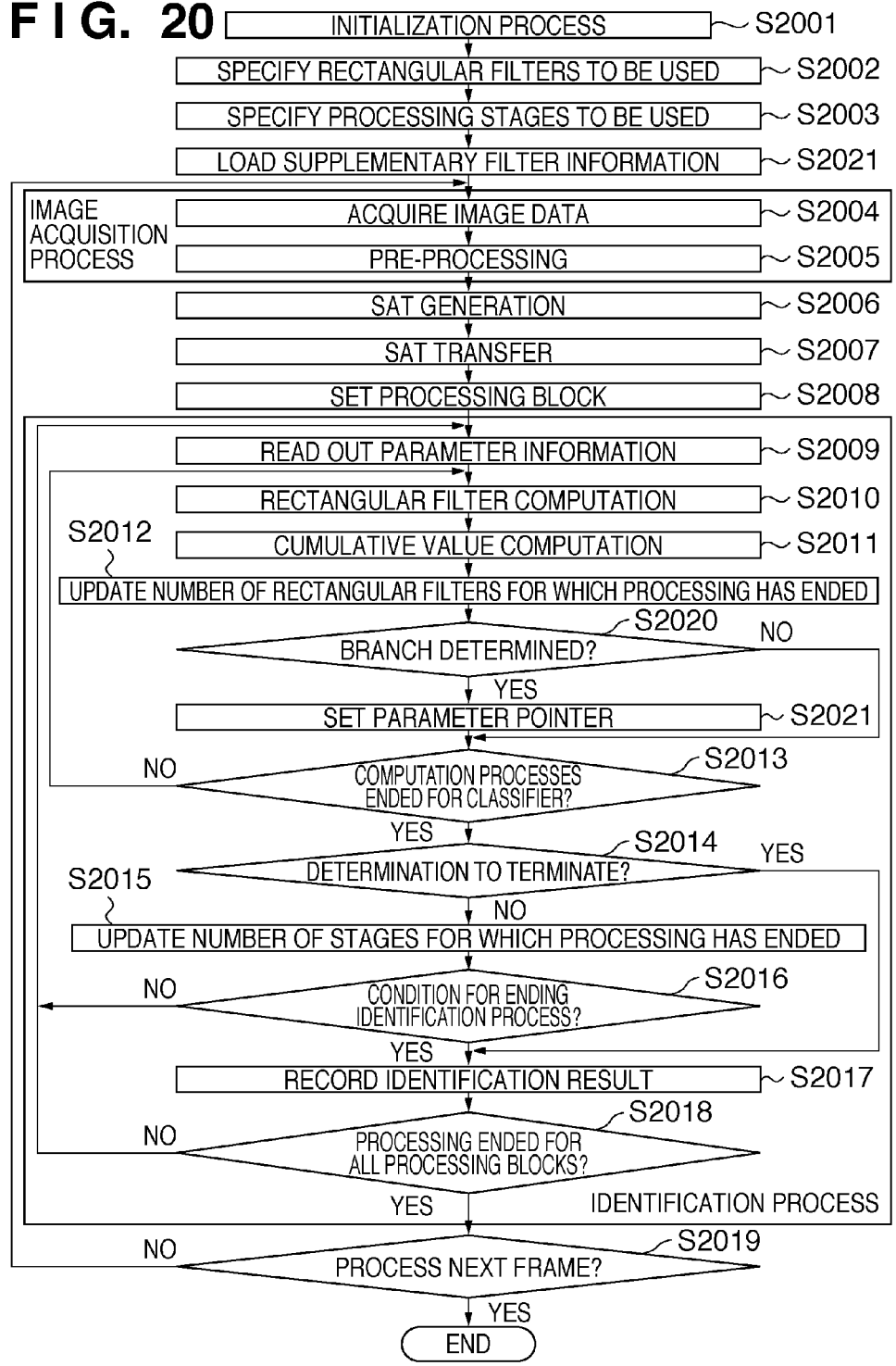
FIG. 20 is a flowchart illustrating operations performed by a pattern identification apparatus according to a seventh embodiment of the present invention.

Hereinafter, details of the present embodiment shall be described using the flowchart shown in FIG. 20. For the sake of simplicity, only the differences from the first embodiment shall be described hereinafter.

In Step S2002, the conditions for specifying the rectangular filter chain to use for processing are set based on the operational clock. To be more specific, the rectangular filter number at which the branch occurs (equivalent to the rectangular filter number) and the address at which the corresponding parameter information is stored are set in a register within the processing execution determination unit 203. Note that hereinafter, the point at which parameter information is loaded from physically different storage locations shall be called a "branch".

Figure 21:
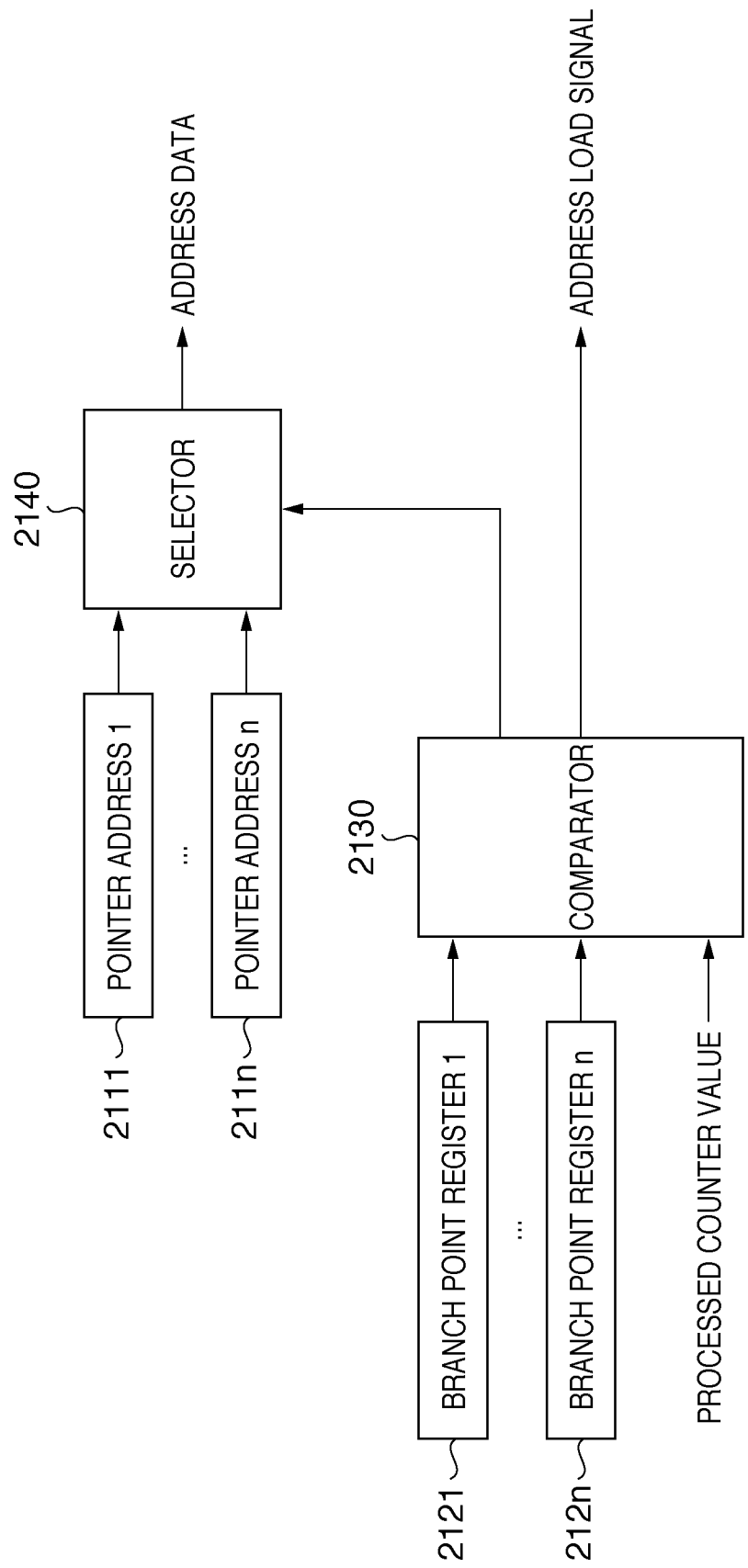
FIG. 21 is a diagram illustrating a portion of a process execution determination unit in the pattern identification apparatus according to the seventh embodiment of the present invention.

FIG. 21 is a diagram illustrating a portion of the process execution determination unit 203 that is unique to the present embodiment. 2111 to 211n are pointer addresses, and make up a register that stores the starting addresses that refer to parameter information that specifies rectangular filters. 2121 to 212n are registers that specify branch points in the rectangular filter chain, and correspond to the numbers of the rectangular filters.

2130 is a comparator that compares the branch point registers with a processed register counter and determines a branch point. When it has been determined that a branch point has been reached, the comparator 2130 outputs an address load signal and an address.

2140 is a selector that selects a branch destination address, corresponding to the branch point, from the pointer addresses 2111 to 211n, based on the output of the comparator. In Step S2002, the branch point registers 2121 to 212n and the pointer addresses 2111 to 211n are set.

In the examples indicated in d or e of FIG. 18, a single branch point register and a single pointer address is set for each stage.

FIG. 22 is a diagram illustrating an example of a table according to the present embodiment that associates operational clocks with the total number of weak classifiers used. In FIG. 22, N1 to N3 and $Th_{xy}$ (x: clock type; y: stage number) are the same variables as in the first embodiment.

$AD_{xy}$ (x: clock type; y: stage number) is pointer information specifying the branch destination address, and $P_{xy}$ (x: clock type; y: stage number) is the rectangular filter number at which the branch occurs.

In Step S2002, the stated table is referred to in accordance with the operational clock, $AD_y$ is set in the pointer addresses 2111 to 211n, and $P_{xy}$ is set in the branch point registers 2121 to 212n.

In the example shown in d of FIG. 18, the parameter information of the rectangular filter is furthermore added to the parameter information of the rectangular filter that has been generated in advance through learning and that has been implemented as hardware using the ROM 205. In Step S2021, the parameter information of the additional rectangular filter for improving the extraction accuracy is loaded into the RAM 204, which is the branch destination address specified in Step S2002.

The parameter information of this additional rectangular filter is data stored in the ROM 205 or the like, and is transferred to the RAM 204 by the CPU 108 in this step.

When the identification processing unit 103 is operating using a high-speed operational clock, there is leeway with regards to the processing time, and thus increasing the number of rectangular filters in this manner leads to an improvement in extraction accuracy.

In the example shown in e of FIG. 18, part of the parameter information of the rectangular filter generated in advance through learning and implemented as hardware using the ROM is switched. In Step S2021, the parameter information of an exchanged rectangular filter for improving the extraction accuracy or the extraction process speed is loaded into the RAM 204, which is the branch destination address specified in Step S2002. This parameter information is data stored in the ROM 109 or the like, and is transferred to the RAM 204 by the CPU 108 in this step.

Through such a configuration, it is possible to switch part of the parameter information of a rectangular filter even if the identification processing unit 103 is implemented as hardware and the details in the ROM 205 have been finalized. The parameter information that is inserted in this switch may be parameter information newly learned so as to improve the performance, or may be parameter information newly learned in addition as a condition for restraining the extraction process speed. Accordingly, it is possible to adjust the tradeoff between the extraction accuracy and the extraction process speed by switching part of the parameter information.

In Step S2003, the number of stages is determined based on the operational clock. This process is the same as that in Step S503.

Next, in Steps S2004 to S2007, the image data to be processed is transferred to the RAM 204. In Step S2008, the processing block is determined, and in Step S2009, the readout of the parameter information is commenced.

Then, a cumulative value is calculated based on the evaluation value, which is the result of a predetermined rectangular filter computation process (Step S2010 to Step S2011). In Step S2012, the number of rectangular filters that have been processed is updated.

In Step S2020, the branch of the rectangular filter chain is determined. To be more specific, this determination is carried out by comparing the filter process number counter with the specified branch point filter number using the comparator 2130 discussed earlier with reference to FIG. 21.

When a branch point has been determined, a new reference destination start address is set for the parameter information in Step S2021. To be more specific, the pointer address 2111 indicated in FIG. 21 is loaded into a memory access address counter (not shown) in the rectangular filter computation unit 201 in accordance with an address load signal.

Thereafter, the processing is carried out while referring to the region set here for the parameter information necessary in the rectangular filter computational process. It is assumed here that the start address of the RAM 204 is stored (Step S2002) in the pointer address 2111.

The rectangular filter computation unit 201 continues the processing while reading out, in order, the parameter information that specifies the rectangular filters, using the address that has been re-set here as the starting address (Steps S2009 to S2013).

Note that the type, from 18d and 18e in FIG. 18, is determined based on the relationship between the number of weak classifiers generated in advance and stored in the ROM 205 and the number of weak classifiers specified for use in extraction, and thus are identical with respect to the configuration.

The following Steps S2013 to S2019 are the same as Steps S513 to S519 in the first embodiment, and thus descriptions thereof shall be omitted.

According to the present embodiment described thus far, the chain of weak classifiers can be switched with flexibility, in accordance with predetermined preconditions.

Although the present embodiment describes loading parameter information for adding to or changing the already-existing parameter information in Step S2021, it should be noted that the configuration may be such that the information is loaded at each stage. In such a case, the parameter information is loaded into the RAM 204 upon it being determined that a stage has ended (Step S2013). Because the RAM 204 is shared between stages when there are plural stages, this configuration makes it possible to implement the present embodiment with a smaller RAM 204.

Furthermore, although the examples shown in 18d and 18e of FIG. 18 illustrated a case where there is a single branching point, the branching point is not limited to a single point; plural points may be present as well. In addition, although the present embodiment discusses branching the weak classifier chain in weak classifier units within a stage, the embodiment is not limited thereto, and the configuration may be such that the branching occurs in stage units. In other words, the storage destinations of all parameter information necessary in all the rectangular filter computation processes in a specific stage may be the RAM 204.

According to the present embodiment as described thus far, it is possible to achieve an increase in performance and tradeoff adjustment even after the identification processing unit 103 has been created as a piece of hardware. Furthermore, it is possible to implement the invention on a smaller scale than when using a configuration that holds all the parameter information in a RAM.

(Eighth Embodiment)

Although the above fifth and sixth embodiments describe a configuration in which the number of weak classifiers to be used is determined in accordance with the image capturing mode, the operational mode, or the like, the present invention is not limited thereto, and may be configured such that the user directly selects the extraction conditions. In such a case, the user specifies the extraction mode via the I/F unit 111.

FIG. 23 is a diagram illustrating an example of a table for determining extraction conditions in the case where there are two extraction modes. N1 to N2 and $Th_{xy}$ (x: clock type; y: stage number) and $M_{xy}$ (x: clock type; y: stage number) are the same as in the second embodiment. By creating such a table in advance, it is possible for the user to directly adjust the tradeoff between the extraction accuracy and the extraction process speed.

In addition, each of the above embodiments discusses applying the method disclosed in Document 1 to the present invention, but the present invention is not limited thereto. The present invention can be applied to various identification processes that carry out identification based on multiple cascade-connected weak classifiers.

In addition, each of the above embodiments discusses using rectangular filters as the weak classifiers, but the present invention is not limited thereto, and can be applied to other various weak classifiers as well.

Moreover, while each of the above embodiments discusses changing the number of stages and the number of rectangular filters within stages, the present invention is not limited thereto. The configuration may be such that the number of stages is fixed and only the number of weak classifiers within a stage is changed. Also, depending on the algorithm, there are also cases where there is only one stage, but the present invention can be applied in such a scheme as well.

In addition, while each of the above embodiments describes a case in which a specific object is extracted from image data, the present invention is not limited thereto; it is also possible to apply the present invention to a device that identifies a specific object (a pattern) from a one-dimensional signal such as an audio signal.

Furthermore, although the above second embodiment describes a configuration in which mask information that specifies the weak classifiers to be used in advance is created based on the reliability level, the present invention is not limited thereto. For example, the configuration may be such that a reliability level threshold is directly set in the processing execution determination unit 203, rather than the mask information $M_{xy}$ shown in FIG. 11 being set in the processing execution determination unit 203. Furthermore, the configuration may be such that the reliability level of the parameter information and the reliability level that is set are compared each time in Step S902, and it is determined whether or not to use the corresponding rectangular filter.

Finally, although each of the above embodiments describes the identification processing unit 103 as being implemented as a hardware device, it should be noted that the configuration may be such that the identification processing unit 103 is implemented as software using a DSP (Digital Signal Processor) or the like.

(Other Embodiments)

The present invention may be applied to a system configured of a plurality of devices (e.g., a host computer, an interface device, a reader, a printer, and so on) or to an apparatus configured of a single device (e.g., a copy machine, a facsimile device, and so on).

Furthermore, it goes without saying that the object of the present invention can also be achieved by supplying, to a system or apparatus, a storage medium in which the program code for software that realizes the functions of the aforementioned embodiments has been stored. In this case, the program code stored in the recording medium is loaded and executed by a computer (or CPU or MPU) of the system or apparatus, whereby the foregoing functions are achieved. Note that in such a case, the present invention is configured of the storage medium in which the program code is stored.

Examples of the recording medium that can be used to supply the program code include floppy (registered trademark) disks, hard disks, optical disks, magneto-optical disks, CD-ROMs, CD-Rs, magnetic tape, non-volatile memory cards, and ROMs.

However, the invention is not intended to be limited to the case where the functions of the aforementioned embodiments are implemented by a computer reading out the program code and executing the program code. It goes without saying that the present invention also includes the case where, for example, the OS (operating system) running on the computer performs part or all of the actual processing based on the instructions of the program code, and the functions of the above-described embodiments are implemented by that processing.

Furthermore, the case where the functions of the aforementioned embodiments are implemented after the program code read out from the recording medium has been written into a memory provided in a function expansion board installed in the computer or a function expansion unit connected to the computer is also included. That is, after the program code has been written into a memory, a CPU or the like included in the function expansion board or the function expansion unit performs part or all of the actual processing based on the instructions of the program code, and the functions are implemented by that processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Application No. 2007-285401 filed on Nov. 1, 2007, which is hereby incorporated by reference herein in its entirety.

The invention claimed is:

1. An information processing apparatus comprising:
   a plurality of weak classifiers that are cascade-connected and that process data;
   a first storage unit that stores processing specification information specifying a processing to be executed by each of the weak classifiers;
   a second storage unit that stores a table in which is specified information for determining which of the weak classifiers are to be used in processing the data in correspondence with a condition for processing the data;
   a selection unit that selects the weak classifiers to be used in processing the data from among the weak classifiers by referring to the table based on a given condition; and
   a control unit that controls the weak classifiers selected by the selection unit to process the data based on the processing specification information corresponding to the selected weak classifiers.

2. The information processing apparatus according to claim 1, further comprising an extraction unit that extracts an object from the data using an evaluation value obtained from a result of the processing by the selected weak classifiers.

3. The information processing apparatus according to claim 2, wherein the number of weak classifiers to be used is specified as the processing specification information in the table in units of stages created by cascade- connecting plural weak classifiers, the processing speed of the extraction unit being used as the condition.

4. The information processing apparatus according to claim 3, wherein the processing speed corresponds to the operational clock of the information processing apparatus.

5. The information processing apparatus according to claim 3,
   wherein the number of stages to be used is specified in the table as the processing specification information; and
   the extraction unit extracts an object from the data using a cumulative value of evaluation values of the weak classifiers obtained per stage by processing the data using the specified number of stages.

6. The information processing apparatus according to claim 2, wherein information designating the weak classifiers to be used is specified as the processing specification information in the table in units of stages created by cascade-connecting plural weak classifiers, the processing speed of the extraction unit being used as the condition.

7. The information processing apparatus according to claim 6, wherein the information designating the weak classifiers to be used is generated based on a reliability level of the weak classifiers included in the processing specification information.

8. The information processing apparatus according to claim 2,
wherein the data is image data composed of a plurality of frames; and
the number of weak classifiers to be used is specified as the processing specification information in the table in units of stages created by cascade-connecting plural weak classifiers, the number of objects extracted by the extraction unit from the previous frame of the image data being used as the condition.

9. The information processing apparatus according to claim 2,
wherein the first storage unit includes a read-only first storage portion and a rewritable second storage portion; and
the extraction unit extracts an object from the data based on the processing specification information stored in the second storage portion for weak classifiers, from among the cascade-connected plurality of weak classifiers, that are located in a predetermined section and based on the processing specification information stored in the first storage portion for weak classifiers, from among the cascade-connected plurality of weak classifiers, that are not located in the predetermined section.

10. The information processing apparatus according to claim 1,
wherein the data is image data generated by an image capturing apparatus; and
the number of weak classifiers to be used is specified as the processing specification information in the table in units of stages created by cascade-connecting plural weak classifiers, the image capturing mode used when the image capturing apparatus generates the image data being used as the condition.

11. The information processing apparatus according to claim 10, wherein the image capturing mode includes a standard mode and a portrait mode, and a lower number of weak classifiers to be used is specified in the table for the standard mode than for the portrait mode.

12. The information processing apparatus according to claim 1,
wherein the data is image data generated by an image capturing apparatus; and
the number of weak classifiers to be used is specified as the processing specification information in the table in units of stages created by cascade-connecting plural weak classifiers, the operational mode of the image capturing apparatus being used as the condition.

13. The information processing apparatus according to claim 12, wherein the operational mode includes an online mode in which image data is processed in parallel with the operation for generating the image data by the image capturing apparatus and an offline mode in which image data is processed after the operation for generating the image data has been completed by the image capturing apparatus, and a lower number of weak classifiers to be used is specified in the table for the online mode than for the offline mode.

14. An information processing method for an information processing apparatus that processes data using a plurality of weak classifiers that are cascade-connected, the method comprising the steps of:
selecting weak classifiers to be used in the processing of the data based on a given condition by referring to a table in which is specified information for determining the weak classifiers to be used in processing the data, in correspondence with a condition for processing the data; and
processing the data using the selected weak classifiers based on processing specification information that corresponds to the weak classifiers selected in the step of selecting, from among the processing specification information specifying a processing to be executed by each of the weak classifiers.

15. A program stored in a non-transitory computer-readable medium, for executing an information processing method for an information processing apparatus that processes data using a plurality of weak classifiers that are cascade-connected, the method comprising the steps of:
selecting weak classifiers to be used in the processing of the data based on a given condition by referring to a table in which is specified information for determining the weak classifiers to be used in processing the data, in correspondence with a condition for processing the data and;
processing the data using the selected weak classifiers based on processing specification information that corresponds to the weak classifiers selected in the step of selecting, from among the processing specification information specifying a processing to be executed by each of the weak classifiers.

\* \* \* \* \*